(12) United States Patent
Raghunathan et al.

(10) Patent No.: US 6,324,679 B1
(45) Date of Patent: Nov. 27, 2001

(54) REGISTER TRANSFER LEVEL POWER OPTIMIZATION WITH EMPHASIS ON GLITCH ANALYSIS AND REDUCTION

(75) Inventors: Anand Raghunathan; Sujit Dey, both of Princeton, NJ (US)

(73) Assignee: NEC USA, Inc., Tokyo (JP)

(*) Notice: Subject to any disclaimer, the term of this patent is extended or adjusted under 35 U.S.C. 154(b) by 0 days.

(21) Appl. No.: 09/088,107

(22) Filed: Jun. 1, 1998

Related U.S. Application Data

(60) Provisional application No. 60/050,939, filed on Jun. 3, 1997.

(51) Int. Cl.$^7$ .............................. G06F 17/50; H03K 19/00
(52) U.S. Cl. .................................. 716/18; 716/21; 716/3
(58) Field of Search ................................................. 716/18

(56) References Cited

U.S. PATENT DOCUMENTS

| | | | |
|---|---|---|---|
| 4,737,666 | 4/1988 | Umeda et al. | 307/480 |
| 5,155,380 | * 10/1992 | Hwang et al. | 307/269 |
| 5,623,223 | * 4/1997 | Pasqualini | 327/298 |
| 5,686,856 | 11/1997 | Piguet et al. | 327/407 |
| 5,831,864 | * 11/1998 | Raghunathan et al. | 364/488 |
| 6,021,381 | * 2/2000 | Ohnishi | 702/60 |
| 6,026,220 | * 2/2000 | Cleereman et al. | 395/500.04 |

OTHER PUBLICATIONS

A. Raghunathan et al., Glitch Analysis and Reduction in Register Transfer Level Power Optimization, Proceedings of the 33rd Annual Conference on Design Automation, pp. 331–336, Jun. 1996.*

A. Raghunathan et al., Register Transfer Level Power Optimization With Emphasis on Glitch Analysis and Reduction, IEEE Transactions on Computer–Aided Design of Integrated Circuits and Systems, pp. 1114–1131, Aug. 1999.*

U. Narayanan et al., Low Power Logic Synthesis Under A General Delay Model, 1998 International Symposium on Low Power Electronics and Design, pp. 209–214, Aug. 1998.*

S. Simon et al., Low Power Datapath Design Using Transformation Similar to Temporal Localization of SFGs, Proceedings of 1999 IEEE International Symposium on Circuits and Systems, pp. 59–61, May 1999.*

N. Midge et al., Class: a CAD System for Automatic Synthesis and Vertication of Asynchronous Finite State Machines, Proceedings 26th Hawaii International Conference on System Sciences, pp. 389–398, Apr. 1995.*

S. Nowick et al., Synthesis of Low–Power Asynchronous Circuits In a Specified Environment, Proceedings of the 1997 International Symposium on Low Power Electronics and Design, pp. 92–95, Aug. 1997.*

(List continued on next page.)

*Primary Examiner*—Matthew Smith
*Assistant Examiner*—A. M. Thompson
(74) *Attorney, Agent, or Firm*—Sughrue, Mion, Zinn, Macpeak & Seas, PLLC

(57) ABSTRACT

A method and apparatus for design-for-low-power of register transfer level (RTL) controller/data path circuits that implement control-flow intensive specifications. The method of the invention focuses on multiplexer networks and registers which dominate the total circuit power consumption and reduces generation and propagation of glitches in both the control and data path parts of the circuit. Further the method reduces glitching power consumption by minimizing propagation of glitches in the RTL circuit through restructuring multiplexer networks (to enhance data correlations and eliminate glitchy control signals), clocking control signals, and inserting selective rising/falling delays, in order to kill the propagation of glitches from control as well as data signals. To reduce power consumption in registers, the clock inputs to registers are gated with conditions derived by an analysis of the RTL circuit, ensuring that glitches are not introduced on the clock signals.

19 Claims, 18 Drawing Sheets

OTHER PUBLICATIONS

R. Panda et al., Technology–Dependent Transformations For Low–Power Synthesis, Proceedings of the 34th Design automation Conference, pp. 650–655, Jun. 1997.*

F. Vahid et al., A Transformation for Integrating VHDL Behavioral Specification With Synthesis and Software Generation, European Design Automation Conference, pp. 552–557, Sep. 1994.*

A. Raghunathan, S. Dey and N.K. Jha, Register–transfer–level power Optimization Techniques With Emphasis on Glitch Analysis and Optimization, Tech. Rep., NEC C&C Research Labs, Princeton, N.J., Oct. 1995.*

A. P. Chandrakasan et al., "Low–Power CMOS Digital Design", 1992 IEEE.

S. Devadas and S. Malik, "A Survey of Optimization Techniques Targeting Low Power VLSI Circuits", Desing Automation Conference, 1995.

H. Vaishnav and M. Pedram, "A Performance Driven Placement Algorithm for Low Power Designs", 1993 IEEE.

P. Landman and J. Rabaey, "Power Estimation for High Level Synthesis", 1993 IEEE.

P. Landman and J. Rabaey, "Black–Box Capacitance Models for Architectural Power Analysis", International Workshop on Low Power Designs, 1994.

D. Marculescu et al., "Information Theoretic Measures of Energy Comsumption at Register Transfer Level", International Symposium on Low Power Design, 1995.

Farid N. Najm, "Towards a High–Level Power Estimation Capability", International Symposium on Low Power Design, 1995.

A. P. Chandrakasan et al., "Optimizing Power Using Transformations"; 1995 IEEE.

A. Chatterjee and R. K. Roy, "Synthesis of Low Power Linear DSP Circuits Using Activity Metrics"; 1994 IEEE.

S. Wuytack et al., "Global Communication and Memory Optimizing Transformations for Low Power Systems", International Workshop on Low Power Design, 1994.

R. Mehra and J. Rabaey, "Behavioral Level Power Estimation and Exploration"; International Workshop on Low Power Design, 1994.

L. Goodby et al., "Microarchitectural Synthesis of Performance–Constrained, Low–Power VLSI Designs", 1994 IEEE.

A. Raghunathan and N. K. Jha, "Behavioral Synthesis for Low Power"; 1994 IEEE.

A. Raghunathan and N. K. Jha, "An ILP Formulation for Low Power Based on Minimizing Switched Capacitance During Data Path Allocation", 1995 IEEE.

J. Chang and M. Pedram, "Register Allocation and Binding for Low Power", Design Automation Conference, 1995.

A. Dasgupta and R. Karri, "Simultaneous Scheduling and Binding for Power Minimization During Microarchitecture Synthesis", International Symposium on Low Power Design, 1995.

M. Stan and W. W. Burleson, "Limited–Weight Codes for Low–Power I/O", International Workshop on Low Power Design, 1994.

E. Musoll and J. Cortadella, "High–Level Synthesis Techniques for Reducing the Activity of Functional Units", International Symposium on Low Power Design, 1995.

C. Papachristou et al., "A Multiple Clocking Scheme for Low Power RTL Design", International Symposium on Low Power Design, 1995.

R. Martin and J. Knight, "Power–Profiler: Optimizing ASICs Power Consumption at the Behavioral Level", Design Automation Conference, 1995.

V. Tiwari et al, "Power Analysis of Embedded Software: A First Step Towards Software Power Minimization", IEEE 1994.

M. Favalli and L. Benini, "Analysis of Glitch Power Dissipation in CMOS Ics", International Symposium on Low Power Design, 1995.

S. Rajgopal and G. Mehta, "Experiences with Simulation–Based Schematic–Level Current Estimation", International Workshop on Low Power Design, 1994.

F. Najm and M. Zhang, "Extreme Delay Sensitivity and the Worst–Case Switching Activity in VLSI Circuits", Design Automation Conference, 1995.

C. Lemonds and S. Shetti, "A Low Power 16 by 16 Multiplier Using Transition Reduction Circuitry", International Workshop on Low Power Design, 1994.

L. Benini et al., "Saving Power by Synthesizing Gated Clocks for Sequential Circuits", IEEE 1994.

S. Bhattacharya et al., "Performance Analysis and Optimization of Schedules for Conditional and Loop–Intensive Specifications", Design Automation Conference, 1994.

S. Bhattacharya et al, "Clock Period Optimization During Resource Sharing and Assignment", Design Automation Conference, 1994.

David B. Lidsky and Jan M. Rabaey, "Low–Power Design of Memory Intensive Functions", IEEE 1994.

S. Bhattacharya et al, "Provably Correct High–Level Timing Analysis without Path Sensitization", 1994 IEEE.

* cited by examiner $c11 = c9 + c10$
$contr[0] = x1 + x3$
$contr[1] = xo$
$contr[2] = x0 + x1.c11 + x3.c10$
$contr[3] = x0 + x1.c11$
$contr[4] = x0 + x1.c11 + x3.c10$
$contr[5] = x1.\overline{c11}.c15 + x2.c15 + x3.\overline{c10}.c15$
$contr[6] = x0 + x4$
$contr[7] = x1.\overline{c11} + x2 + x3.\overline{c10}$
$contr[8] = x1.\overline{c11}.c15 + x2.c15 + x3.\overline{c10}.c15$
$contr[9] = x0 + x1.\overline{c11}.c15 + x2.c15 + x3\overline{c10}.c15 + x4$

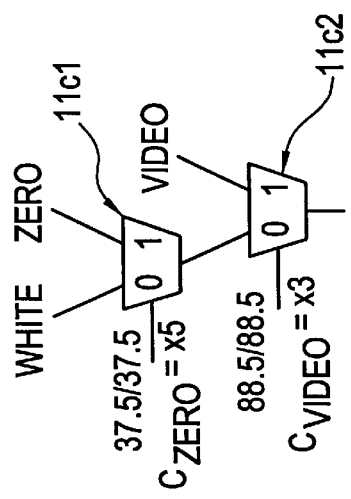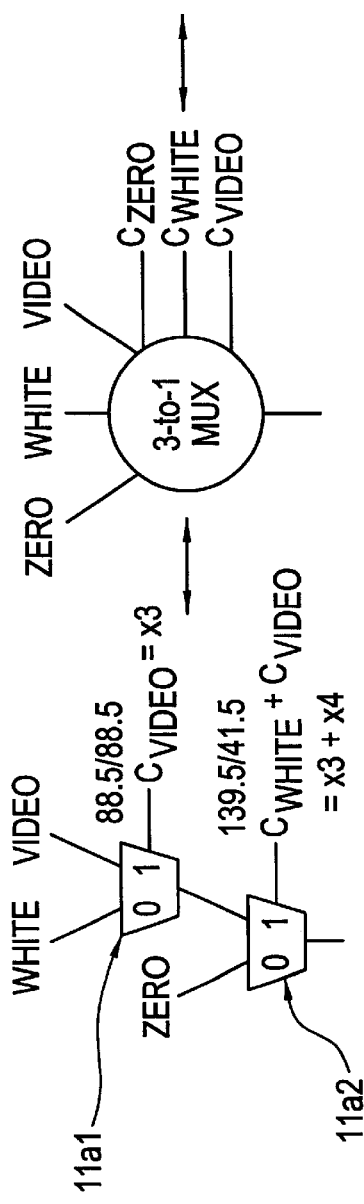

$C_{c21} = x3.c5$
$C_{ZERO} = x3.\overline{c5}$

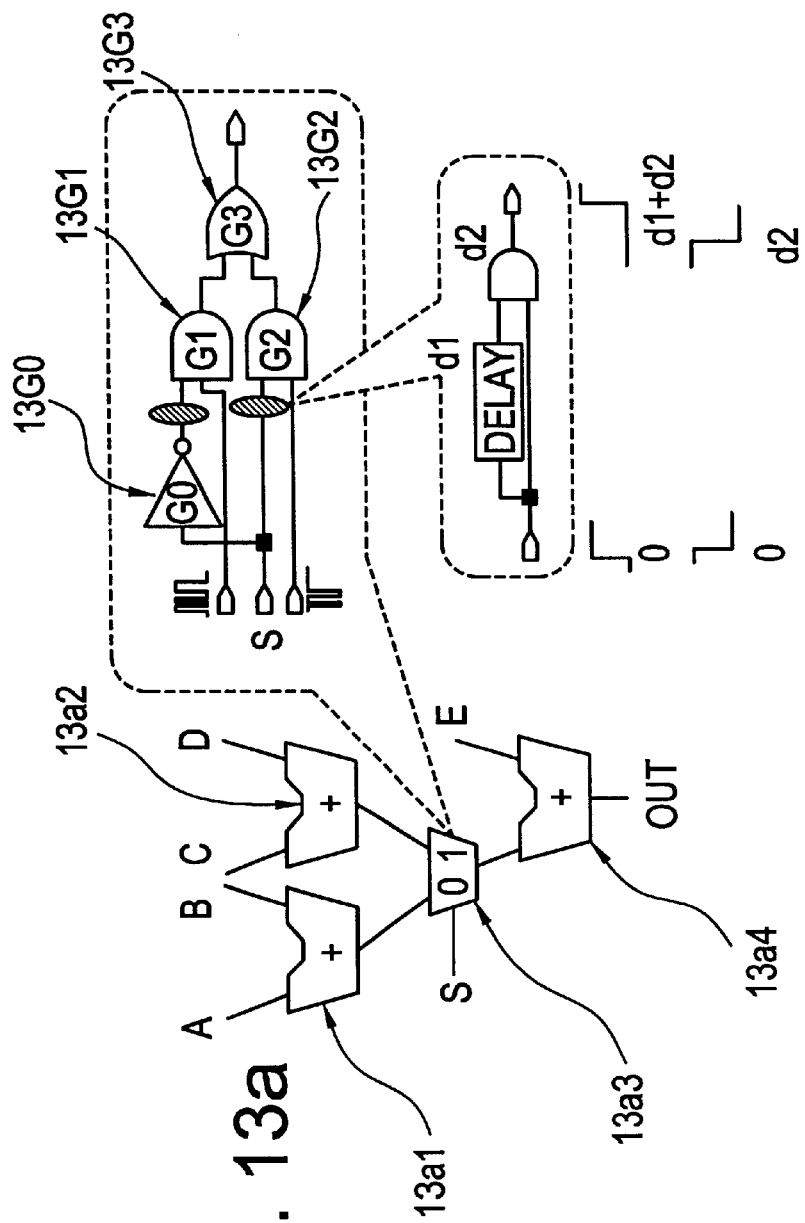

Activity at Signal MUXOUT:
Before Clocking $C_{c20}$ : 910.5/285.5
After Clocking $C_{c20}$ : 536/285.5

FIG. 16
Procedure overview

```
Procedure RTL_GLITCH_REDUCTION(RTL_circuit)
{
    COLLAPSE_MUX_NETWORKS(RTL_circuit);
    LEVELIZE_CIRCUIT(RTL_circuit);
    level ← 0;
    activity_stats ← COLLECT_ACTIVITY_STATISTICS(RTL_Circuit);
    delay_stats ← COLLECT_DELAY_STATISTICS(RTL_Circuit);
    while (level ≤ MAX_LEVEL(RTL_circuit)){
        for (each node RTL_node at level){
            GR_Transform(RTL_node, activity_stats, delay_stats);
        }
        level + +;
    }
}

Procedure GR_TRANSFORM(RTL_node, activity_stats, delay_stats)
{
    switch (RTL_node.type){
    case MUX: // multiplexers feeding FUs or Registers
        CREATE:_MINGLITCH_MUX_TREE_LEVEL_(RTL_ node, activity_stats, delay_
            stats);
    case CONTROL: // MUX select signals, ALU function selects
        CLOCK_CONTROL_SIGNALS(RTL_node, delay_stats);
    }
}

Procedure CREATE_MINGLITCH_MUX_TREE_LEVEL (MUX_node, activity_stats,
    delay_stats)
{
    data_input_list ← list of all nodes feeding data inputs of MUX_node;
    while (data_input_list ≠ ϕ){
        Select (best_inp1, best_inp2) such that GLITCH_ACTIVITY_ESTIMATE
            (best_inp1, best_inp2) is minimum
        New_2x1_MUX ← CREATE_2x1_MUX(MUX_node,best_inp1,best_inp2);
        INSERT_SELECTIVE_DELAYS(New_2x1_MUX,activity_stats, delay_stats);
        ADD_CONSENSUS_GATES(New_2x1_MUX, activity_stats,delay_stats);
        New_control_node ← CONTROL node corresponding to New_2x1_MUX;
        CLOCK_CONTROL_SIGNALS(New_control_node, delay_stats);
    }
}
```

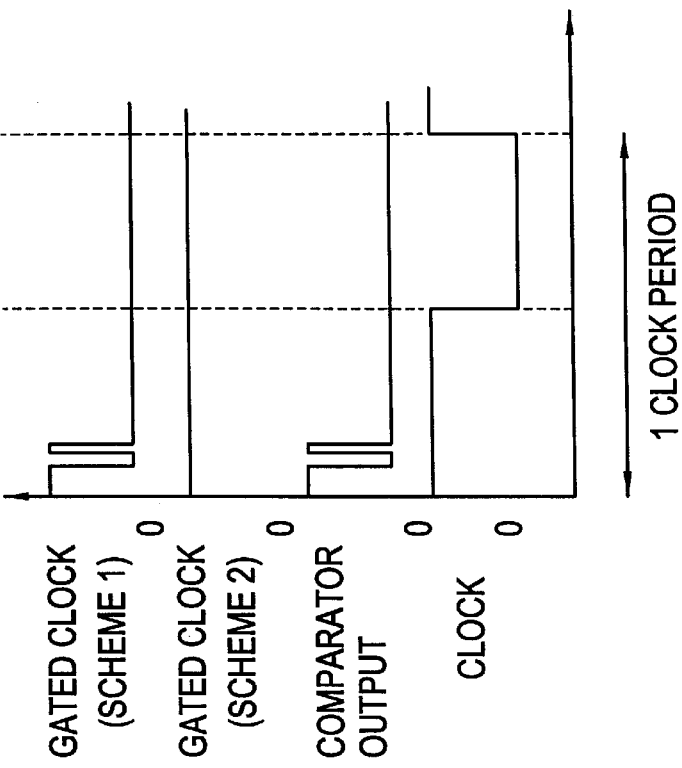
FIG. 17c
FIG. 17b
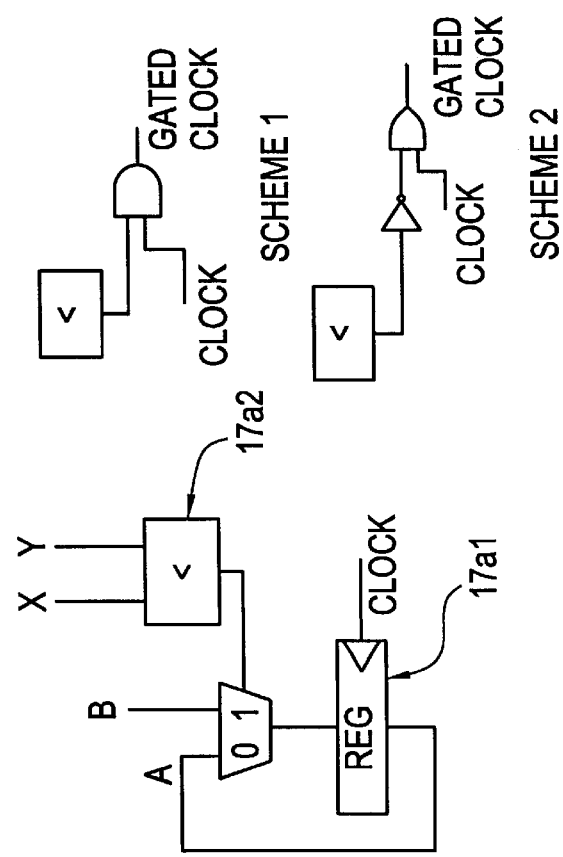
FIG. 17a

Gating Condition = contr[0] . $\overline{contr[1]}$

FIG. 20

| Block | Power Consumed (% of total) |
|---|---|
| Functional units | 9.08% |
| Random Logic | 4.67% |
| Registers | 39.55% |
| Mutiplexers | 46.70% |

FIG. 21

| Signal | Activity | |
|---|---|---|
| | With Gl. | Without Gl. |
| Control Signals | | |
| contr[0] | 71 | 70.5 |
| contr[1] | 22 | 22 |
| contr[2] | 72 | 20 |
| contr[3] | 42 | 20 |
| contr[4] | 72 | 20 |
| contr[5] | 55.5 | 54 |
| contr[6] | 22 | 22 |
| contr[7] | 50 | 20 |
| contr[8] | 55.5 | 54 |
| contr[9] | 77 | 70.5 |
| Data Path Signals | | |
| dp2[7..0] | 71.5 | 21.5 |
| dp4[7..0] | 92 | 26 |
| dp5[7..0] | 1124.5 | 247 |
| dp7[7..0] | 1044.5 | 273 |
| dp9[7..0] | 321.5 | 80.5 |

FIG. 22

| Circuit | Original | | | Optimized | | | Power Red. % |
|---|---|---|---|---|---|---|---|
| | Power | Area | Delay | Power | Area | Delay | |
| GCD | 8.738mW | 1037 | 32.29ns | 7.229mW | 1034 | 31.94ns | 17.27% |
| Barcode | 9.409mW | 1945 | 49.73ns | 7.770mW | 1968 | 47.29ns | 17.42% |
| UAV | 10.878mW | 1954 | 83.48ns | 8.023mW | 1967 | 83.15ns | 26.25% |
| Vendor | 10.471mW | 1595 | 70.13ns | 7.725mW | 1617 | 71.63ns | 26.22% |
| Graphics | 9.653mW | 3865 | 132.60ns | 6.751mW | 3914 | 132.68ns | 30.06% |
| X.25 | 2.056mW | 2409 | 129.53ns | 1.658mW | 2434 | 135.11ns | 19.36% |

REGISTER TRANSFER LEVEL POWER OPTIMIZATION WITH EMPHASIS ON GLITCH ANALYSIS AND REDUCTION

I. DESCRIPTION OF THE INVENTION

This application claims priority from co-pending U.S. Provisional Patent Application Ser. No. 60/050,939 filed on Jun. 3, 1997.

IA. FIELD OF THE INVENTION

This invention relates to reduction of power consumption for digital VLSI sequential circuits. Specifically, this invention relates to a system and method for reducing power consumption by reducing glitches. This invention is embodied in a system and in methods for reducing power consumption in a sequential circuit by reducing glitches.

IB. BACKGROUND OF THE INVENTION

Reducing power consumption in VLSI circuits has become important for several reasons. Mobile or portable electronic devices, which already account for a significant portion of all consumer electronics sold, are battery driven. Reducing power consumption in the various components of such systems prolongs the life of the batteries, which is highly desirable. Excessive power consumption also leads to an increase in chip packaging and cooling costs, which increase the total system cost. Another benefit of reduced power consumption is increased reliability of VLSI circuits. Reducing average power consumption or peak power consumption have their own merits. For example, reducing average power consumption increases battery life, while reducing peak power consumption reduces packaging and cooling costs. This invention seeks to minimize average power consumption.

Most savings in power consumption can be obtained through a combination of several techniques applied at different levels of the design hierarchy. Several design and synthesis techniques have been proposed for power optimization at the technology. See A. P. Chandrakasan, S. Sheng, and R. W. Brodersen, "Low-power CMOS digital design," *IEEE J. Solid-State Circuits*, pp. 473–484 (April 1992).

Such techniques have been applied to the transistor level. See S. Devadas and S. Malik, "A survey of optimization techniques targeting low power VLSI circuits," in *Proc. Design Automation Conf.*, pp. 242–247 (June 1995). Physical level of a sequential circuit design is another area where such techniques have been applied. See H. Vaishnav and M. Pedram, "PCUBE: A performance driven placement algorithm for low power designs," in *Proc. European Conf. Design Automation*, pp. 72–77, (September 1993). Similarly such techniques have also been applied at the logic design level. See S. Devadas and S. Malik, "A survey of optimization techniques targeting low power VLSI circuits," in *Proc. Design Automation Conf.*, pp. 242–247 (June 1995).

On the architectural power estimation front, a method based on a uniform white noise model of signal statistics was presented in S. R. Powell and P. M. Chau, "Estimating power dissipation of VLSI signal processing chips: the PFA technique," in *Proc. VLSI Signal Processing IV*, pp. 250–259 (1990). A more accurate estimation method based on a dual-bit-type model was presented in P. E. Landman and J. M. Rabaey, "Power estimation for high level synthesis," in *Proc. European Conf. Design Automation*, pp. 361–366 (February 1993) and P. E. Landman and J. M. Rabaey, "Black-box capacitance models for architectural power analysis," in *Proc. Int. Vlkshp. Low Power Design*, pp. 165–170 (April 1994). The use of entropy as a measure of average switching activity, and its use in high-level power estimation was suggested in D. Marculescu, R. Marculescu, and M. Pedram, "Information theoretic measures for energy consumption at the register-transfer level," in *Proc. Int. Symp. Low Power Design*, pp. 81–86 (April 1995) and F. N. Najm, "Towards a high-level power estimation capability," in *Proc. Int. Synp. Low Power Design*, pp. 87–92 (April 1995). Early work in architectural power optimization was presented in A. P. Chandrakasan, S. Sheng, and R. W. Brodersen, "Low-power CMOS digital design," *IEEE J. Solid-State Circuits*, pp. 473–484 (April 1992) and A. P. Chandrakasan, M. Potionjak, R. Mehra, J. Rabaey, and R. Brodersen, "Optimizing power using transformations," *IEEE Trans. Computer-Aided Design*, vol. 14, pp. 12–31 (January 1995). In A. P. Chandrakasan, S. Sheng, and R. W. Brodersen, "Low-power CMOS digital design," *IEEE J. Solid-State Circuits*, pp. 473–484 (April 1992) the use of architectural parallelism was proposed based on data path replication and pipelining to enable supply voltage scaling for power reduction. A methodology that used a variety of architectural transformations to reduce power consumption was presented in A. P. Chandrakasan, M. Potionjak, R. Mehra, J. Rabaey, and R. Brodersen, "Optimizing power using transformations," *IEEE Trans. Computer-Aided Design*, vol. 14, pp. 12–31 (January 1995). In A. Chatterjee and R. K. Roy, "Synthesis of low power DSP circuits using activity metrics," in *Proc. 7th Int. Con VLSI Design*, pp. 265–270 (January 1994), switching activity metrics were used to reduce power consumption in bit-serial digital filters. Optimizing memory-dominated computations for power consumption was addressed in S. Wytack, F. Catthoor, F. Franssen, L. Nachtergaele, and H. D. Man, "Global communication and memory optimizing transformations for low power systems," in *Proc. Int. Wkshp. Low Power Design*, pp. 203–208 (April 1994), and D. Lidsky and J. Rabaey, "Low-power design of memory intensive functions," in *Proc. Symp. Low Power Electronics*, pp. 16–17, (October 1994). Tools for power estimation and design space exploration at the behavior level were presented in R. Mehra and J. Rabaey, "Behavioral level power estimation and exploration," in *Proc. Int. Wkshp. Low Power Design*, pp. 197–202 (April 1994). In L. Goodby, A. Orailoglu, and P. M. Chau, "Microarchitectural synthesis of performance-constrained, low-power VLSI designs," in *Proc. Int. Conf. Computer Design*, pp. 323–326 (October 1994), module selection and pipelining were used to combat the performance degradation that results from reducing the supply voltage. Methods for performing allocation and assignment in order to minimize switching activity and switched capacitance in the data path were presented in A. Raghunathan and N. K. Jha, "Behavioral synthesis for low power," in *Proc. Int. Conf. Computer Design*, pp. 318–322 (October 1994), A. Raghunathan and N. K. Jha, "An ILP formulation for low power based on minimizing switched capacitance during datapath allocation," in *Proc. Int. Symp. Circuits & Systems*, pp. 1069–1073 (May 1995), J. M. Chang and M. Pedram, "Register allocation and binding for low power," in *Proc. Design Automation Conf.*, pp. 29–35 (June 1995), and A. Dasgupta and R. Karri, "Simultaneous scheduling and binding for power minimization during microarchitecture synthesis," in *Proc. Int. Symp. Low Power Design*, pp. 69–74 (April 1995). Techniques to reduce power consumption during high level synthesis based on reducing activity in functional units were presented in E. Musoll and J. Cortadella, "High-level synthesis techniques for reducing the activity of functional units," in *Proc. Int. Symp. Low Power Design*, pp. 99–104 (April 1995). The use of limited-weight codes to minimize power consumption in buses and I/O circuitry was described in M. Stan and W. P. Burleson, "Limited-weight codes for low-power I/O," in *Proc. Int. Wkshp. Low Power Design*, pp. 209–214 (April 1994). A multi-phase clocking scheme for RTL circuits that reduces activity by naturally imposing shut-off for inactive parts of the circuit was proposed in C. Papachristou, M. Spining, and M. Nourani, "A multiple clocking scheme for low power RTL design," in *Proc. Int. Symp. Low Power Design*, pp. 27–32 (April 1995). An optimization tool for average and peak power consumption during behavioral synthesis, based on genetic search was described in R. S. Martin and J. P. Knight, "Power Profiler: Optimizing ASICs power consumption at the behavioral level," in *Proc. Design Automation Conf.*, pp. 42–47 (June 1995). Techniques for software power estimation and optimization were presented in V. Tiwari, S. Malik, and A. Wolfe, "Power analysis of embedded software: a first step towards software power minimization," in Proc. Int. Conf. Computer-Aided Design (November 1994).

The importance of eliminating glitches in the design of digital VLSI circuits has been recognized for a long time. Avoiding glitches or hazards is known to be of great importance in a synchronous circuit design and the design of D/A and A/D converters. Several studies have reported the importance of considering glitching power during power estimation and optimization, see M. Favalli and L. Benini, "Analysis of glitch power dissipation in CMOS IC's," in *Proc. Int. Symp. Low Power Design*, pp. 123–128 (April 1995), and S. Rajagopal and G. Mehta, "Experiences with simulation-based schematic-level power estimation," in *Proc. Int. Wkshp. Low Power Design*, pp. 9–14 (April 1994). The extreme sensitivity of glitching power to process variations has been pointed out in M. Favalli and L. Benini, "Analysis of glitch power dissipation in CMOS IC's," in *Proc. Int. Symp. Low Power Design*, pp. 123–128 (April 1995) and F. N. Najm and M. Y. Zhang, "Extreme delay sensitivity and the worst-case switching activity in VLSI circuits," in *Proc. Design Automation Conf.*, pp. 623–627 (June 1995), where it was shown that the switching activity and power consumption due to glitches vary much more with process variations than the other components of power dissipation. The design of a multiplier with significantly reduced glitching power consumption was described in C. Lemonds and S. S. M. Shetti, "A low power 16 by 16 multiplier using transition reduction circuitry" in *Proc. Int. Wkshp. Low Power Design*, pp. 139–142 (April 1994). However, very few automated design and synthesis techniques exist for reducing glitching power consumption in general circuits. At the architecture and behavior levels, most previous work on power estimation and optimization ignores the effects of glitching, in particular, the effect of glitch propagation across the boundaries of blocks in the architecture has not been considered. While accurate library modeling approaches such as described in P. E. Landman and J. M. Rabaey, "Black-box capacitance models for architectural power analysis," in *Proc. Int. Wkshp. Low Power Design*, pp. 165–170 (April 1994), can be used to account for the effect of glitches within architectural blocks, they typically assume that inputs to these blocks are glitch-free.

Most previous work at the architecture and behavior levels has also sought to focus on data-flow intensive designs, where arithmetic units like adders and multipliers account for most of the total power consumption. However, the power consumed by the functional units constitutes a small fraction of the total power consumption, while multiplexer networks and registers can consume a major part of the total power for such designs.

A large part of the register power consumption arises due to transitions on the register's clock input. The technique of gating clocks has been used by designers to selectively turn off parts of a system. Methods to automatically detect conditions under which the clock inputs to all the registers in a design can be shut off, based on identifying self-loops and unreachable states in the state transition graph (STG), were presented in L. Benini, P. Siegel, and G. DeMicheli, "Saving power by synthesizing gated clocks for sequential circuits," *IEEE Design & Test of Computers*, pp. 32–41, Winter 1994. However, the techniques described in the last reference can be applied only to the control and random logic parts of a design for which it is feasible to extract the STG.

An example of an RTL circuit which computes the greatest common divisor (GCD) of two numbers is shown in FIG. 1. The inputs are applied at XIN and YIN, and the GCD is written into register OUTPUT. Since the number of cycles required for computing the GCD depends on the input values provided, an additional output signal RDY indicates when the result is available in OUTPUT. This circuit was derived from a behavioral description of the GCD algorithm. A high-level synthesis system called SECONDS was used to perform resource allocation, scheduling, and assignment to result in the RTL circuit shown in FIG. 1. See S. Bhattacharya, S. Dey, and F. Brglez, "Performance analysis and optimization of schedules for conditional and loop-intensive specifications," in *Proc. Design Automation Conf.*, pp. 491–496 (June 1994); S. Bhattacharya, S. Dey, and F. Brglez, "Clock period optimization during resource sharing and assignment," in *Proc. Design Automation Conf.*, pp. 195–200 (June 1994); and S. Bhattacharya, S. Dey, and F. Brglez, "Provably correct high-level timing analysis without path sensitization," in *Proc. Int. Conf. Computer-Aided Design*, pp. 736–742 (November 1994).

The circuit shown in FIG. 1 consists of one functional unit—a subtractor, two equal-to (=) comparators, one less-than (<) comparator, registers, multiplexer trees, the controller finite state machine (FSM), and the decode logic. The decode logic generates the control signals that configure the multiplexers in the circuit. The controller FSM and the decode logic are referred to collectively as the control logic of the circuit. The logic expressions implemented by the control logic are also shown in the figure. The literals x0 through x4 represent the decoded present state lines from the controller. Literals c9, c10, and c15 represent results of the three comparators in the circuit.

The RTL circuit shown in FIG. 1 is mapped to a standard library like the NEC CMOS6 library, see CMOS6 Library Manual, NEC Electronics, Inc. (December 1992). A simulation-based power calculation tool is used to measure power consumption in various parts of the design. See CSIM Version 5 Users Manual, Systems LSI Division, NEC Corp., 1993.

Table 1 shown in FIG. 20 provides the split up of the total power consumption into separate figures for functional units (subtractor and three comparators), random logic (controller FSM and decode logic blocks), registers (including power consumed due to clock transitions), and multiplexers. It indicates that most of the power consumption is in the multiplexers and registers. Several circuits that implemented other control-flow intensive and mixed specifications also confirm these results.

Such data has been collected on the transition activity with and without glitches in various parts of the design. The transition activity without (excluding) glitches can be obtained by simulating the circuit under a zero-delay model. The simulations are performed using input vectors that are derived from the test bench for the behavioral specification. Table 2 shown in FIG. 21 shows the total bit transitions with and without glitches for all the control signals, and selected data path signals (CSIM counts each 0→1 or 1→0 transition as half a transition. Hence, the transition numbers that are reported throughout the present disclosure may be fractional). Control signal contr[i] feeds the select input of the multiplexer marked [i] in FIG. 1, where i is an integer between 0 and 9. Similarly, data path signal dp[i] corresponds to the output of the multiplexer marked [i] in FIG. 1. Clearly, a significant portion of the total transition activity at several signals in the circuit is due to glitches. Several control signals in the GCD circuit, like contr[2] and contr[4] are highly glitchy. The generation of glitches on control signals will be analyzed below, and it will be illustrated, that control signal glitches can have a profound effect on the glitching power consumption in the rest of the circuit.

The following example illustrates how ignoring glitches result in designs that have sub-optimal power consumption.

EXAMPLE 1

The two RTL architectures shown in FIGS. 2(*a*) and 2(*b*) both implement the simple function: if (x<y) then z=c+d else z=a+b. ARCHITECTURE 2 uses more resources than ARCHITECTURE 1 since the former uses two adders 2*b*2 and 2*b*3 as opposed to one adder 2*a*2 for the latter. Based on the number of operations performed, a metric that is commonly used to estimate power consumption at the behavioral and architectural levels, ARCHITECTURE 2 consumes more power than ARCHITECTURE 1. This conclusion is supported by power estimation results which do not take glitches into account. However, when accurate power estimation that also considers glitches is performed, it turns out that ARCHITECTURE 2 actually consumes 17.7% less power than ARCHITECTURE 1.

This result can be explained as follows. As it will be shown below, the comparators 2*a*1 and 2*b*1 generate glitches at their outputs though their inputs are free of glitches. In the case of ARCHITECTURE 1, these glitches then propagate through the two multiplexers 2*a*3 and 2*a*4 to the inputs of the adder, which causes a significant increase in glitching activity and hence power consumption in the two multiplexers and the adder. In ARCHITECTURE 2, though the comparator generates glitches as before, the effect of these glitches is restricted to the single multiplexer 2*b*4.

Conventional sequential circuit design techniques do not provide effective techniques for reducing power consumption arising from glitches in RTL circuits.

II. SUMMARY OF THE INVENTION

It is an objective of this invention to provide techniques to reduce power consumption due to glitches in sequential circuits that are specified at the register transfer level (RTL) of the design hierarchy.

Specifically it is an object of this invention to reduce power consumption in register-transfer level (RTL) VLSI circuits by minimizing glitching power consumption by transforming the RTL VLSI circuit.

It is another object of this invention to develop various techniques that can be used to minimize glitching power consumption in RTL circuits with minimum size and delay overheads.

yet another object of the invention is to provide a glitch-reduction procedure that applies the various glitch reduction techniques to components in the RTL circuit in suitable order.

Yet another object of the invention is to provide a system for reducing power consumption in register-transfer level (RTL) VLSI circuits, wherein said system minimizes glitching power consumption by transforming the RTL VLSI circuit.

To achieve the objects of the invention it is provided a method of reducing power consumption in register-transfer level (RTL) VLSI circuits, wherein said method minimizes glitching power consumption by transforming the RTL VLSI circuit.

Still further improvements include a method for reducing glitching power consumption, wherein said method comprises transforming a network corresponding to at least one multiplexer to increase correlations between data inputs.

Still further improvements include a method for reducing glitching power consumption, wherein said method comprises transforming a network corresponding to at least one multiplexer to eliminate glitchy control signals.

Still further improvements include a method for reducing glitching power consumption, wherein said method comprises transforming a network corresponding to at least one multiplexer to minimize glitch propagation from its data inputs.

Still further improvements include a method for reducing glitching power consumption, wherein said method comprises inserting clocking gates at control signals.

Still further improvements include a method for reducing glitching power consumption, wherein said method comprises selecting rising delay gates to minimize glitch propagation.

Still further improvements include a method for reducing glitching power consumption, wherein said method comprises selecting falling delay gates to minimize glitch propagation.

Still further improvements include a method for reducing glitching power consumption, wherein said method comprises: (a) pre-processing the RTL VLSI circuit to collapse all networks of multiplexer components into single multiplexers with arbitrary numbers of data inputs; (b) collecting activity statistics for at least one signal in the RTL VLSI circuit; (c) collecting delay statistics for said at least one signal in the VLSI RTL circuit; (d) selecting a component in the VLSI RTL circuit to transform next; (e) applying at least one of a pre-defined set of transformations to the component selected in step (d) to reduce glitching power consumption; and (f) repeating steps (b)–(e) for all components in the RTL VLSI circuit.

In a further improvement a component in the VLSI RTL circuit to be transformed next is selected using steps of: (1) replacing the component with a set of 2-to-1 multiplexers feeding a multiplexer with a reduced number of inputs if the component is a multiplexer with greater than two inputs; and (2) clocking the output signal by inserting one of an AND OR gate with its side input fed by one of the clock signal and the complement of said clock signal if the component is a control logic node, Further improvements include a method for replacing the component with a set of 2-to-1 multiplexers feeding a multiplexer with a reduced number of inputs if the component is a multiplexer with greater than two inputs, wherein said method comprises: (i) creating a list containing all the multiplexer's data inputs; (ii) choosing and deleting two inputs from the list such that the estimated glitching activity of a 2-to-1 multiplexer fed by the two inputs is minimum; (iii) disconnecting the two inputs from the 2-to-1 multiplexer; (iv) creating a new 2-to-1 multiplexer fed by the two inputs; (v) connecting output of the new 2-to-1 multiplexer as an input of the multiplexer; (vi) inserting selective delays based on delay and activity information into the new 2-to-1 multiplexer created in (iv); (vi) inserting a clocking gate at the select input of the new 2-to-1 multiplexer created in (iv); (viii) repeating steps (ii)–(vii) for all elements of the list created in (i).

Yet another aspect of this invention is a method for further reducing power consumption by gating the clock inputs to registers, said method comprising: (a) identifying a self-loop from a register output to its input that passes through at least one multiplexers; (b) identifying select signal conditions under which said at least one multiplexer selects the an on-path input; (c) deriving clock gating condition for the register as a conjunction of individual multiplexer select signal conditions; (d) using the condition derived in step (c) if an estimated arrival time at the gating signal satisfies required timing constraints. (e) deriving a reduced gating condition if the condition derived in step (c) does not satisfy the required timing constraints.

Yet another aspect of this invention is a system for reducing power consumption in register-transfer level (RTL) VLSI circuits comprising one of random and control logic, at least one functional unit, at least one register, and at least one multiplexer, wherein said system minimizes glitching power consumption by transforming the RTL VLSI circuit.

Still further improvements include a system for reducing power consumption in register-transfer level (RTL) VLSI circuits, wherein said system transforms a network corresponding to at least one multiplexer to increase correlations between data inputs.

Still further improvements include a system for reducing power consumption in register-transfer level (RTL) VLSI circuits, wherein said system transforms a network corresponding to at least one multiplexer to eliminate glitchy control signals.

Still further improvements include a system for reducing power consumption in register-transfer level (RTL) VLSI circuits, wherein said system transforms a network corresponding to at least one multiplexer to minimize glitch propagation from its data inputs.

Still further improvements include a system for reducing power consumption in register-transfer level (RTL) VLSI circuits, wherein said system inserts clocking gates at control signals.

Still further improvements include a system for reducing power consumption in register-transfer level (RTL) VLSI circuits, wherein said system selects rising delay gates to minimize glitch propagation.

Still further improvements include a system for reducing power consumption in register-transfer level (RTL) VLSI circuits, wherein said system selects falling delay gates to minimize glitch propagation.

Still further improvements include a system for reducing power consumption in register-transfer level (RTL) VLSI circuits, wherein the system further reduces power consumption by gating clock signals to registers for which a self-look exists from the register output to its input that passes through at least one multiplexer.

III. BRIEF DESCRIPTION OF THE DRAWINGS

The above objectives and advantages of the present invention will become more apparent by describing in detail preferred embodiments thereof with reference to the attached drawings in which:

FIG. 1 shows the RTL architecture of a GCD circuit.

FIG. 2(a) and 2(b) show two alternate architectures that implement a function. FIG. 2(a) shows architecture where glitches effect the two multiplexers and the adder, while in the circuit shown in FIG. 2(b) the effect of the glitches is restricted to the single multiplexer.

FIG. 8(a)–8(d) show propagation of glitches on a multiplexer select signal for various values of data signals.

Figure 9:
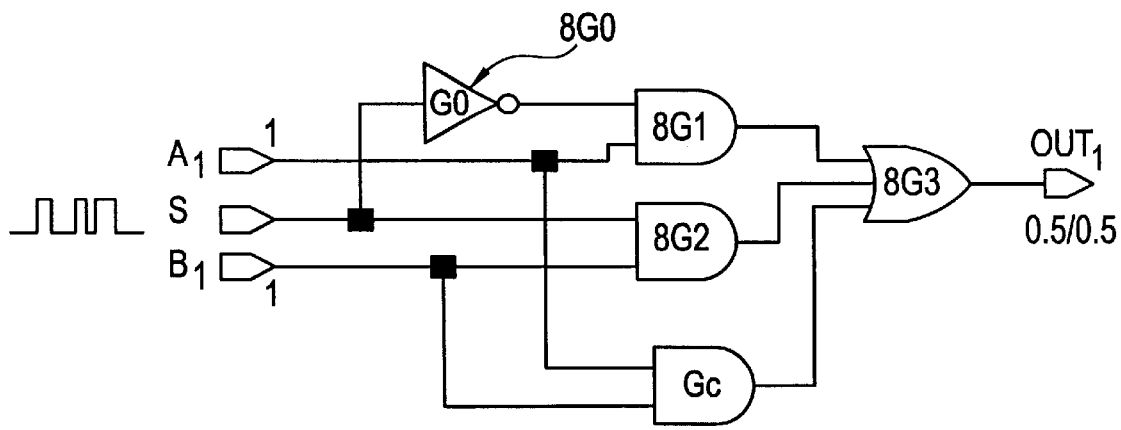

FIG. 9 shows effect of adding the consensus term on glitch propagation.

Figure 10B:
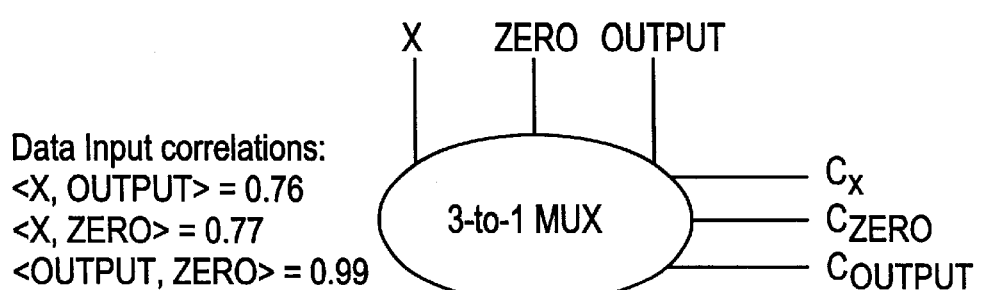
Figure 10A:
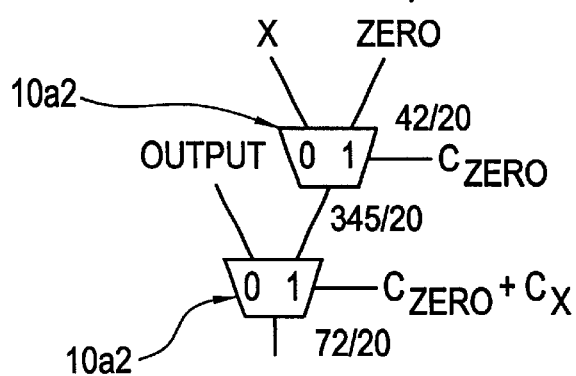
Figure 10C:
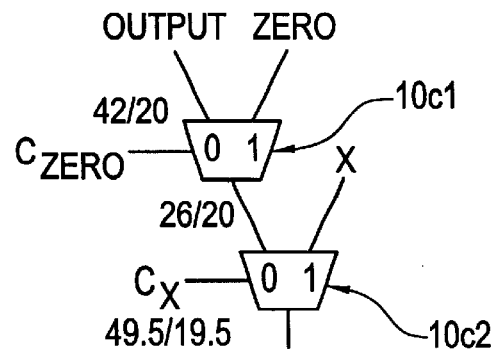

FIG. 10(a)–10(c) show restructuring of multiplexer to enhance data correlations. FIG. 10(a) shows initial multiplexer network, FIG. 10(b) shows an equivalent abstract 3-to-1 multiplexer, and FIG. 10(c) shows the restructured network.

FIG. 11(a)–11(c) show method for eliminating glitchy control signals. FIG. 11(a) shows initial multiplexer network, FIG. 10(b) shows an equivalent abstract 3-to-1 multiplexer, and FIG. 10(c) shows restructured network.

Figure 12A:
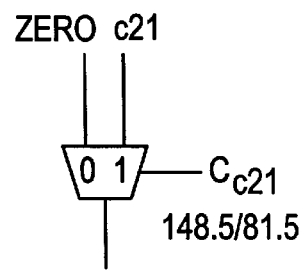
Figure 12B:
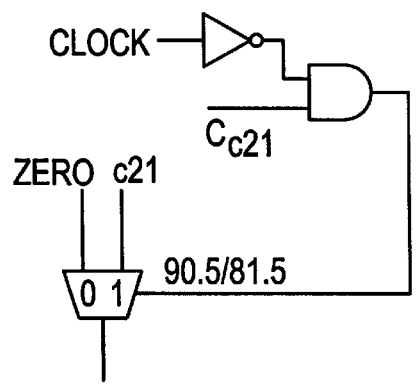
Figure 12C:
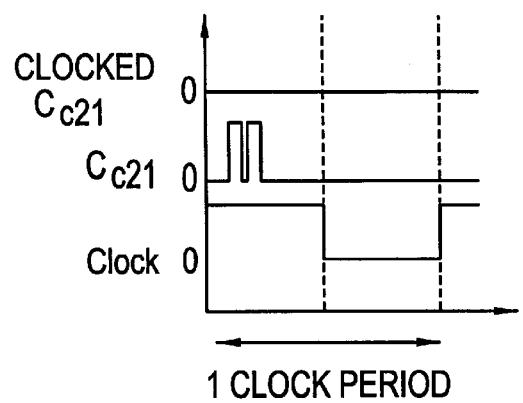

FIG. 12(a)–12(c) show method for using clocking signals to kill glitches. FIG. 12(a) shows initial multiplexer network, FIG. 10(b) shows multiplexer network with clocked control signal, and FIG. 10(c) shows sample waveforms.

FIG. 13(a)–13(c) show method for using selective delays to reduce glitches. FIG. 13(a) shows the example circuit, FIG. 13(b) shows multiplexer bit-slice with selective delays inserted, and FIG. 13(c) shows the implementation of a rising delay block.

Figures 14A, 14B, 14C:
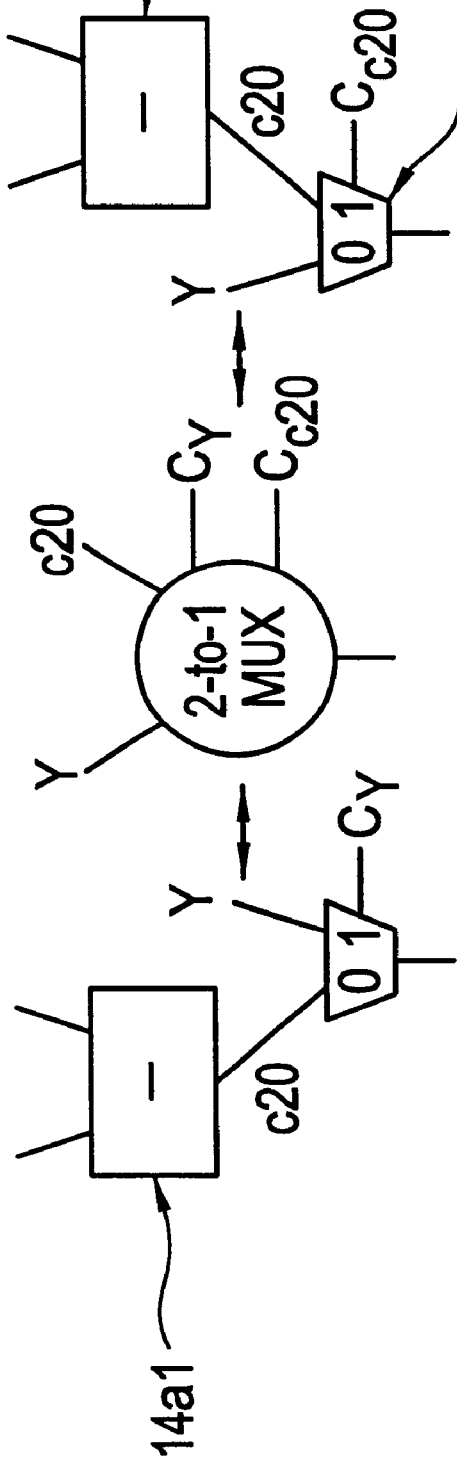

FIG. 14(a)–14(c) show method for using multiplexer restructuring transformations to reduce propagation of glitches. FIG. 14(a) shows initial multiplexer network, FIG. 14b shows an abstract multiplexer, and FIG. 14(c) shows the restructured network.

Figure 15A:
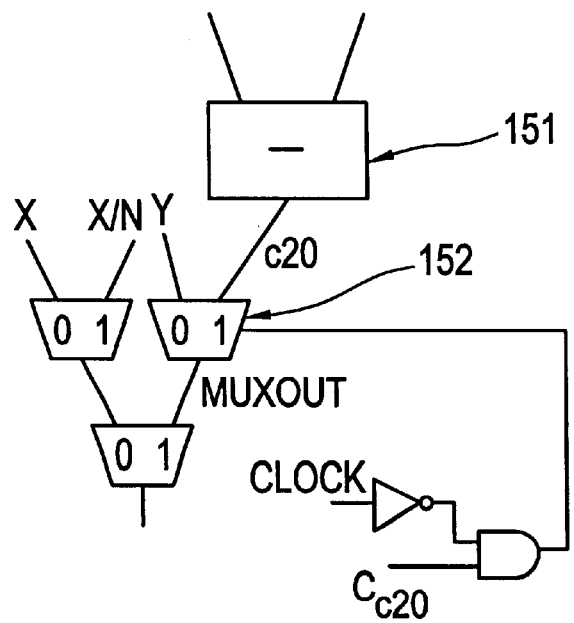
Figure 15B:
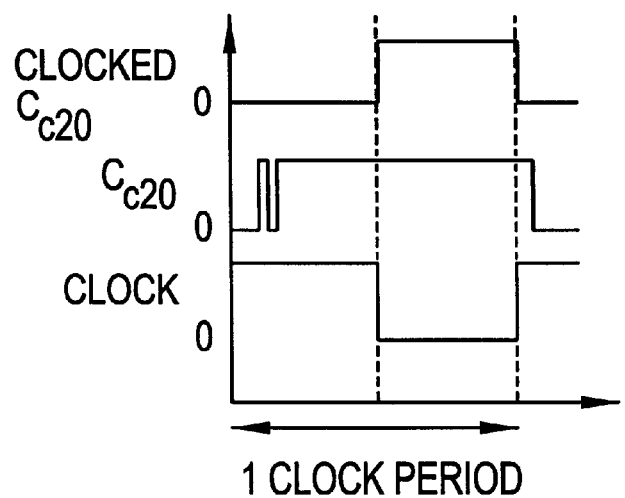

FIG. 15(a) and 15(b) show method for using clocking control signals to kill data signal glitches. FIG. 15a shows example circuit and FIG. 15(b) shows sample waveforms.

FIG. 16 shows pseudo-code for the glitch reduction procedure that constitutes preferred embodiment of the invention.

FIG. 17(a)–17(c) show method for gating clock inputs to registers to reduce glitches. FIG. 17(a) shows example circuit, FIG. 17(b) shows two candidate schemes implementing gated clocks, and FIG. 17(c) shows sample waveforms.

Figure 18:
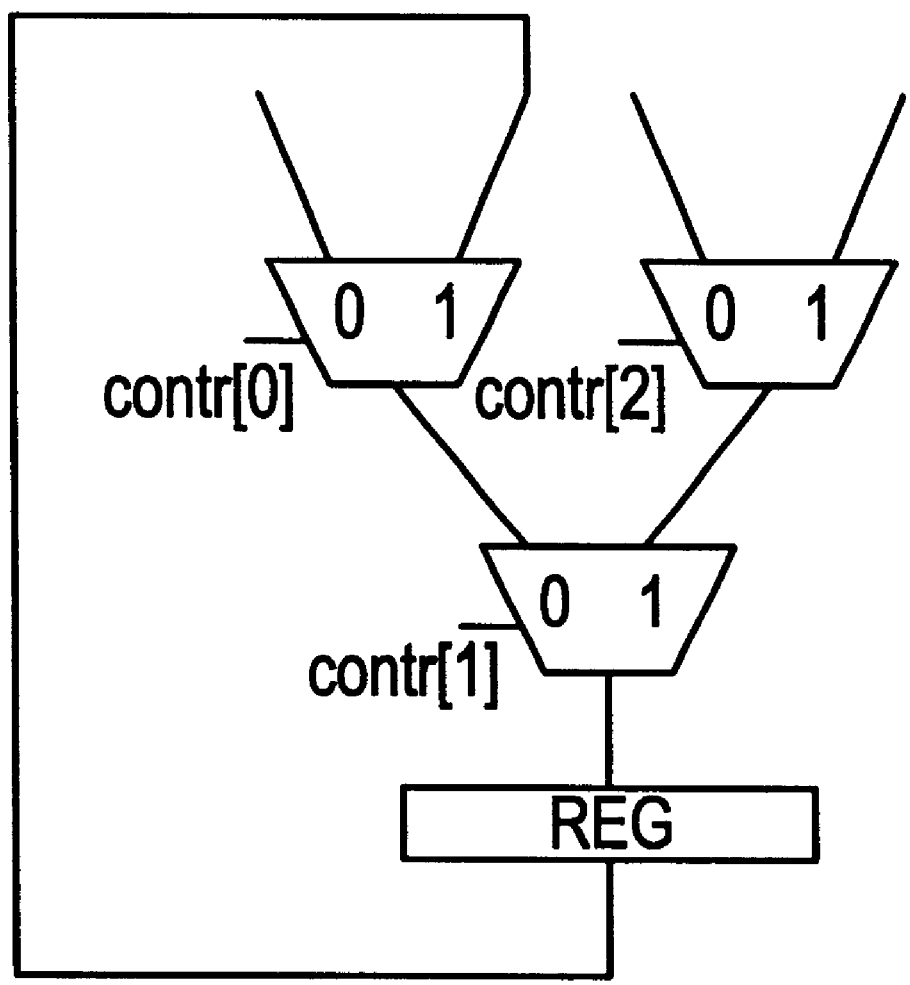

FIG. 18 shows method for deriving clock gating conditions for registers.

Figure 19:
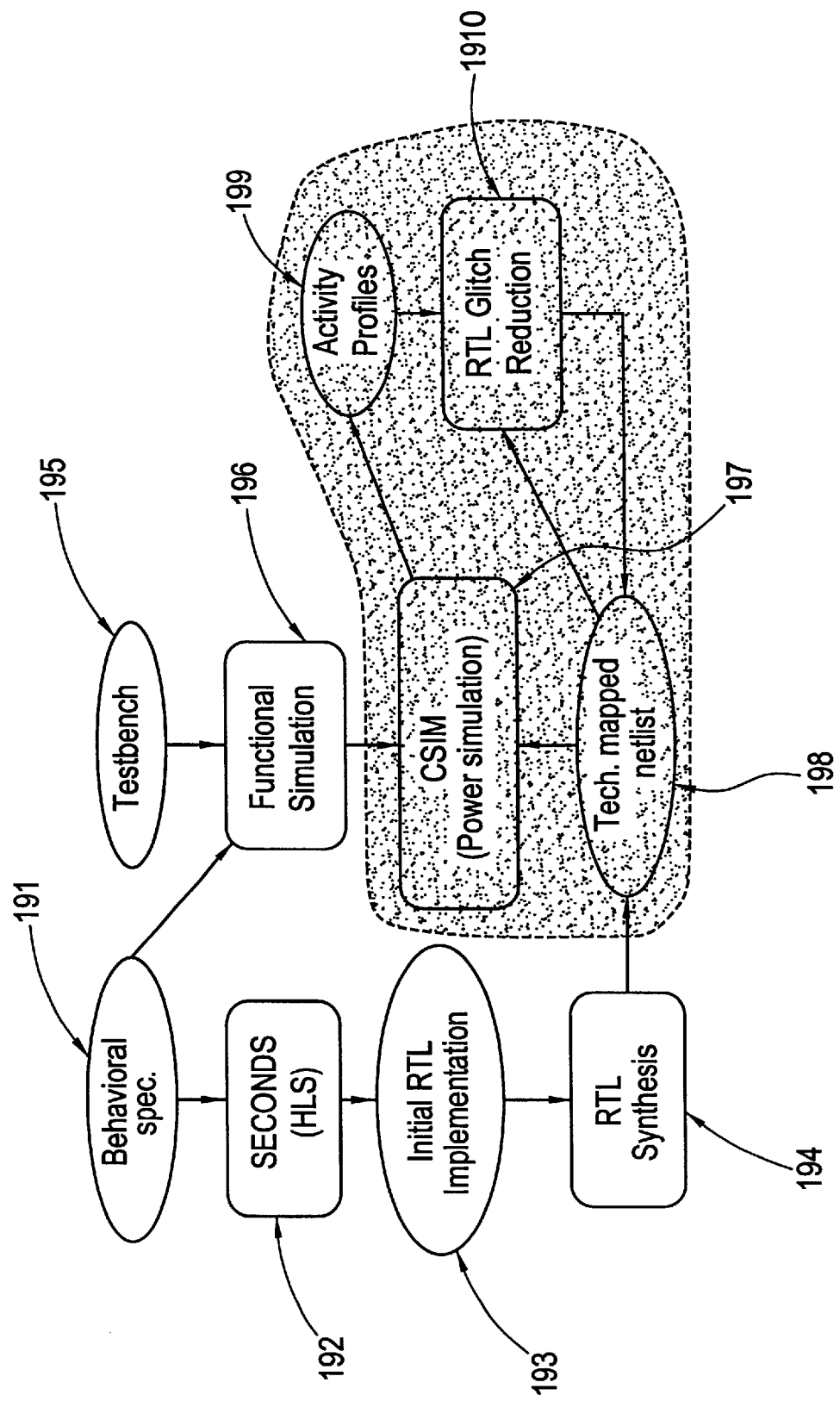

FIG. 19 shows the design flow used in the experiments.

FIG. 20 shows Table 1 that provides a split up of the total power consumption into separate figures for an example circuit.

FIG. 21 shows Table 2 that shows the total bit transitions with and without glitches for all the control signals, and selected data path signals for an example circuit.

FIG. 22 shows Table 3 that reports the results of experiments showing the effectiveness of the present invention.

IV. DETAILED DESCRIPTION OF THE INVENTION

The invention reduces glitching power consumption in RTL circuits by transforming the RTL circuit in such a way as to minimize the propagation of glitches through different blocks of the circuit.

IVA. Glitch Generation and Propagation

The disclosed glitch reduction techniques are based on the analysis of generation and propagation of glitches in RTL circuits. For clarity, the glitch generation in the data path blocks (functional units, comparators, and multiplexer trees) and in the control logic are illustrated separately.

IVA.1 Glitch Generation in Data Path Blocks

The following example illustrates that data path blocks can generate a significant amount of glitches.

EXAMPLE 2

Figure 3:
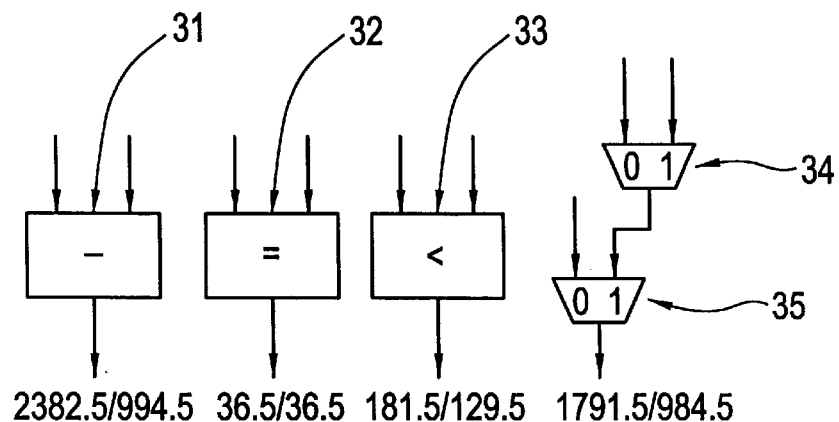
FIG. 3 shows glitch generation in various data path blocks in an example sequential circuit.

The elements shown in FIG. 3—a subtractor 31, an equal-to comparator 32, a less-than comparator 33, and a 3-to-1 multiplexer tree 34 & 35—are representative data path blocks for studying glitch generation. The registers do not generate glitches at their outputs. To Study generation and propagation of glitches within above data path blocks, each block is mapped to a library like the NEC CMOS6 library, and then simulated under long input sequences that consist of random vectors. The total number of bit-transitions (including glitches) at the block outputs and the number of zero-delay transitions (i.e., the number of transitions not counting glitches) are measured. The block outputs in FIG. 3 are annotated with the results, where the numbers indicate transitions with and without glitches, respectively. The results clearly indicate significant generation of glitches in various data path blocks. In the equal-to comparator 32, no glitches are generated due to the fact that all its paths are balanced. However, even in such cases, wiring delays can disturb the balance of delays and thus cause generation of glitches.

When data path blocks like those shown in FIG. 3 are connected together, the glitches generated by the various blocks propagate through the following blocks, causing in several situations, as illustrated later, an explosion in glitches and glitching power consumption. The disclosed techniques control the propagation and explosion of glitches by killing most, if not all, of the glitches at various locations in the circuit.

IVA.2 Glitch Generation in the Control Logic

Though the control logic itself accounts for only a small portion of the total circuit power, it has a significant role in the total circuit power due to its ability to generate glitches on the control signals, and the effects of glitchy control signals on the rest of the circuit. Hence, it is important to study how the control logic generates glitches, a topic that has not been addressed in the previous work on power optimization at the architecture or behavior levels. The inputs to the decode logic within the control logic are fed by the outputs of comparators and the state flip-flops of the controller. The outputs of the control logic include the control signals fed to the data path. It has been already demonstrated that the outputs of comparators can be glitchy. The glitches on the comparator outputs can propagate through the control logic and cause glitches on the control signals. The control logic can also generate a lot of glitches even if its inputs are glitch-free. The following examples illustrate and help to analyze the generation of glitches in the control logic.

EXAMPLE 3

Figure 1:
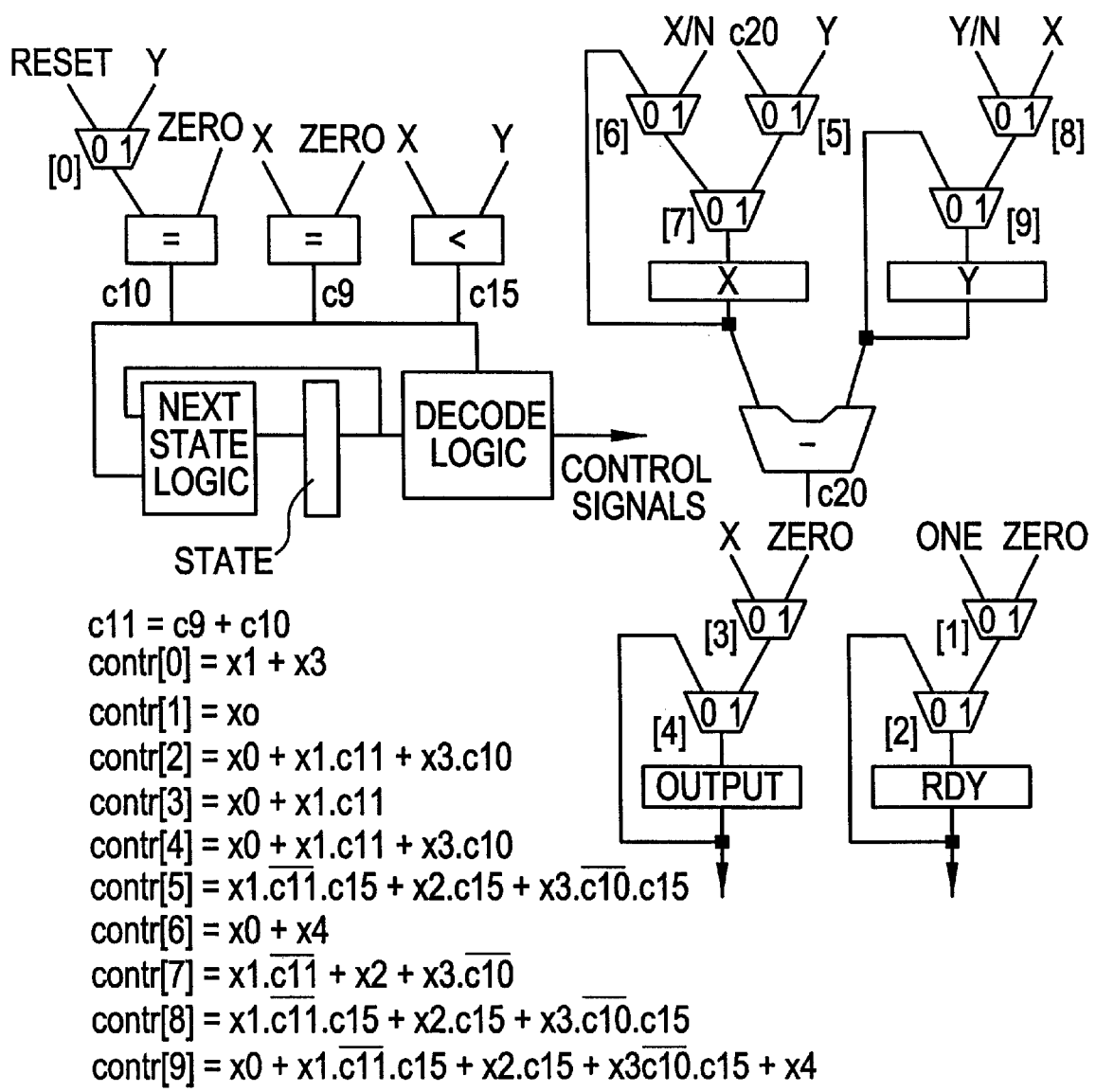
Figure 2B:
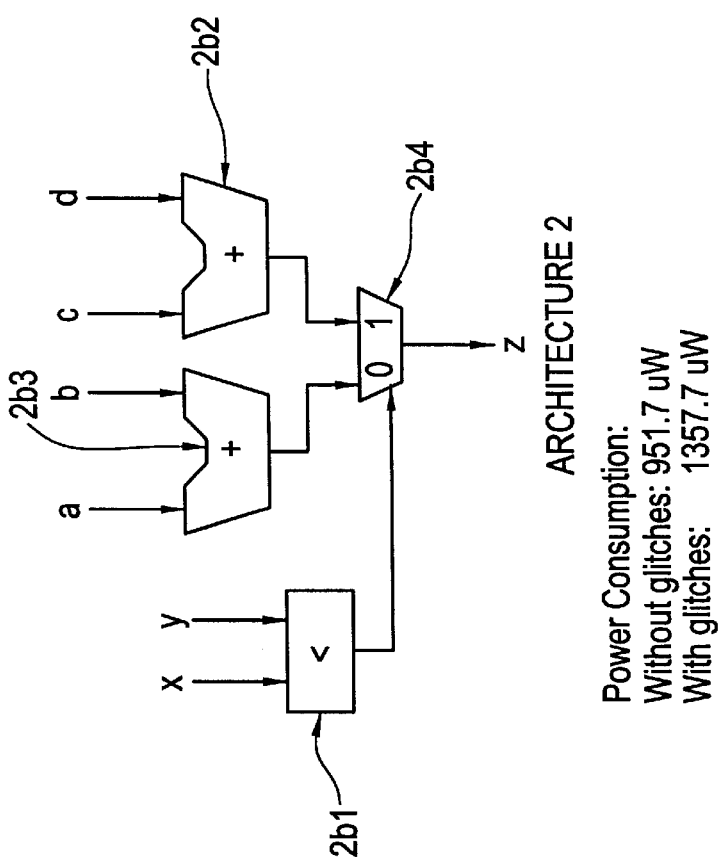
Figure 2A:
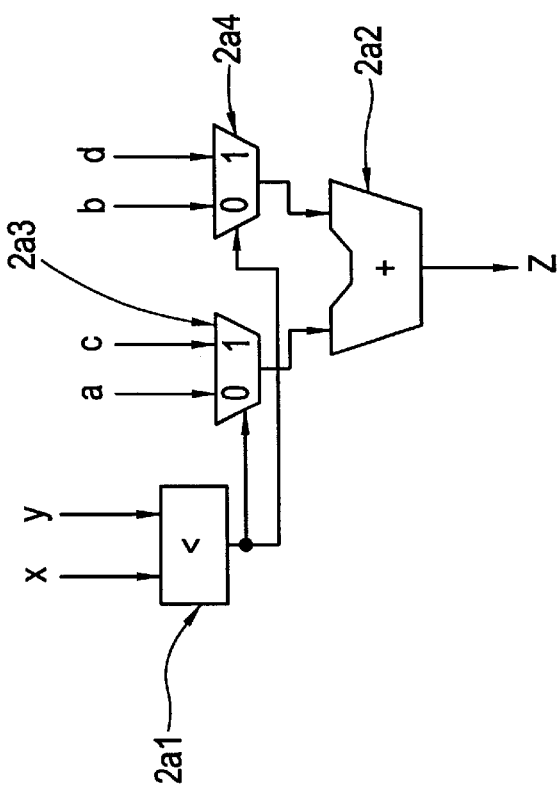
Figure 4A:
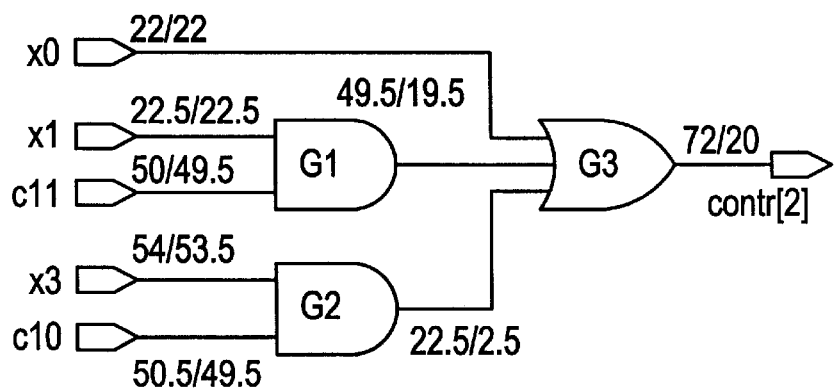
FIG. 4(a) shows an implementation of control signal contr[2] of the example circuit of FIG. 1.

Control signal contr[2] in the RTL circuit shown in FIG. 1 is highly glitchy according to the statistics of Table 2. The portion of the decode logic that implements this control signal is shown in FIG. 4(a). It has been observed that though the inputs are largely glitch-free, significant glitches are generated at AND gates G1 and G2. Careful analysis shows that the generation of glitches is attributable to two conditions:

C1: A rising transition on signal x1 is frequently accompanied by a falling transition on c11. Thus, the rising transition on x1 and the falling transition on c11 are highly correlated.

C2: Transitions on signal x1 arrive earlier than transitions on signal c11.

Figure 4B:
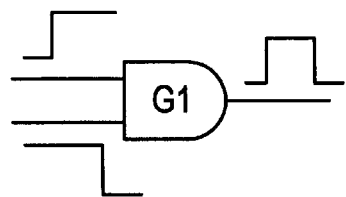
FIG. 4(b) shows generation of glitches at gate G1 of the example circuit of FIG. 1.

Condition C1 arises due to the functionality of the design: most of the times when state s is entered (rising transition on x1), the comparisons evaluated by the comparators feeding c9 and c10 evaluate to 0, changing from 1 in the previous state. On the other hand, condition C2 is a result of the delay/temporal characteristics of the design. These conditions, captured graphically in FIG. 4(b), lead to the generation of glitches at gate G1, that propagate to control signal contr[2]. A similar explanation holds for the output of gate G2 being glitchy.

EXAMPLE 4

Figure 5:
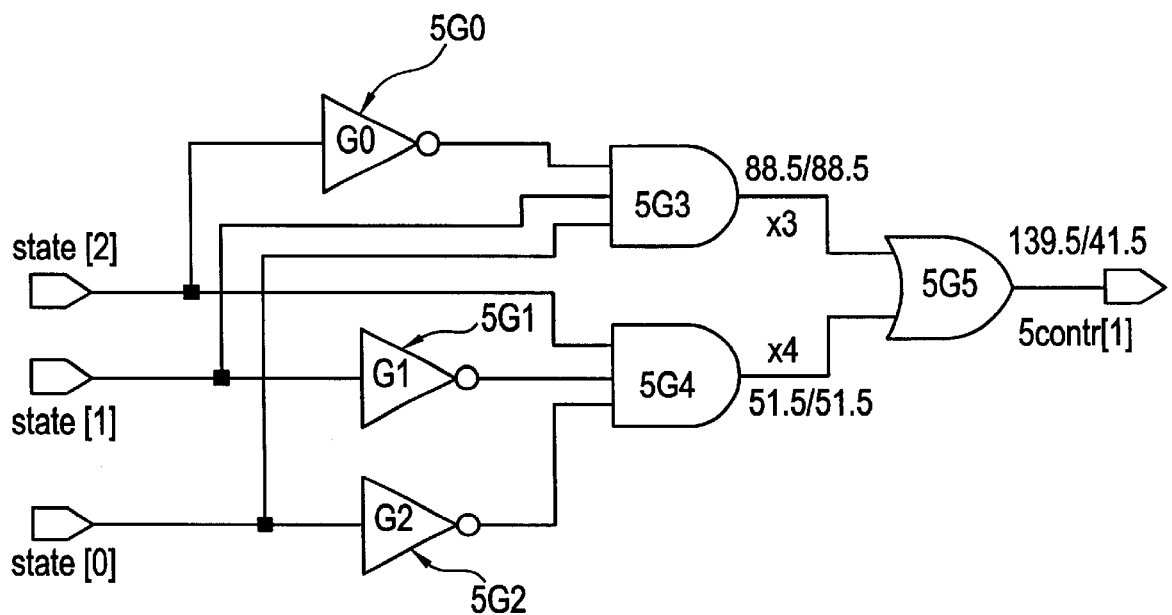
FIG. 5 shows an implementation of control signal contr[1] in an example RTL circuit that is a preprocessor for a barcode reader.

This example uses a portion of an RTL circuit that is a processor for a barcode reader and the analysis focuses on a particular control signal, contr[1], whose implementation is given in FIG. 5. Signals state[2], state[1] and state[0] are fed by the flip-flops of the controller. Signals x3 and x4 represent decoded state signals, i.e., x3 (x4) assumes a logic value of 1 if and only if the controller is in state s3 (s4), or equivalently, state[2]... state[0] assume the values 011 (100). Signals x3, x4 and control signal 5 contr[1] are annotated with their transition counts including and excluding glitches. The figures indicate that the output of gate 5G5 is highly glitchy even though glitches do not occur at its inputs.

Figure 6A:
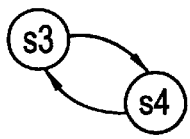
FIG. 6(a) shows partial STG for Barcode controller.
Figure 6B:
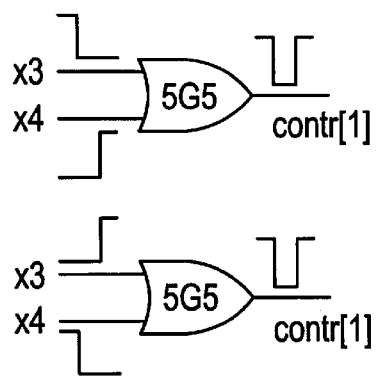
FIG. 6(b) shows generation of glitches at gate G5.

In order to explain the generation of glitches at gate 5G5, the partial state transition graph for the controller that is shown in FIG. 6(a) must be considered. The figure indicates a loop involving states s3 and s4. This results from a while loop in the VHDL behavioral specification. Since this loop is the innermost loop among all loops in the behavioral description, it is executed a large number of times. Thus, the state transitions from s3 to s4 and from s3 to s4 are frequently executed. FIG. 6(b) shows how the inputs and output of gate 5G5 vary under these two state transitions. A transition from s3 to s4 causes a rising transition on signal state[2], and falling transitions on signals state[1] and state

[0]. These transitions in turn cause rising and falling transitions on signals x4 and x3, respectively. However, the rising transition on x4 arrives later than the falling transition on x3, since the delays of inverters 5G1 and 5G2 are reflected in the former, while the delay of inverter 5G0 is not reflected in the latter. This results in a 1- 0-1 static hazard or glitch at the output of gate 5G5, as shown in FIG. 6(*b*). Similarly, a controller state transition from s4 to s3 leads to a rising transition on x3 and a falling transition x4 such that the former transition arrives later. This again leads to glitches at the output of gate 5G5 as shown in FIG. 6(*b*).

In general, glitches are generated at the control signals due to the simultaneous presence of the following two conditions:

(i) Functional: correlation between rising and falling transitions at two or more signals that feed a gate.

(ii) Temporal: the controlling to non-controlling transition arrives earlier at the gate's input. (A controlling value at a gate's input determines the value at the gate's output independent of the values at the other inputs to the gate.)

IVB. Reducing Glitch Propagation from Control Signals

As shown above, significant glitches can be generated on control signals of the circuit. These glitches can propagate through the other parts of the circuit, causing significant power dissipation. One of the objects of the invention is to stop glitches on control signals as close to their source as possible in order to reap the maximum benefits in terms of power savings. Each of the glitch-reduction techniques will be illustrated separately through examples. Then these techniques will be integrated into a single power optimization framework that constitutes the preferred embodiment of the invention.

IVB.1 Glitchy Control Signals and Data Correlations.

Figure 7:
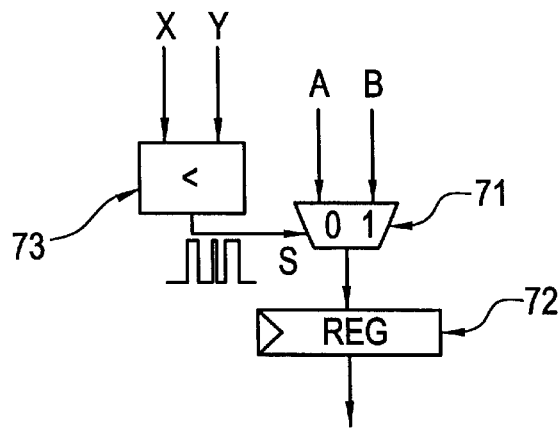
FIG. 7 shows an example circuit which is used to demonstrate the effect of data signal correlations on propagation of control signal glitches.
Figure 8A:
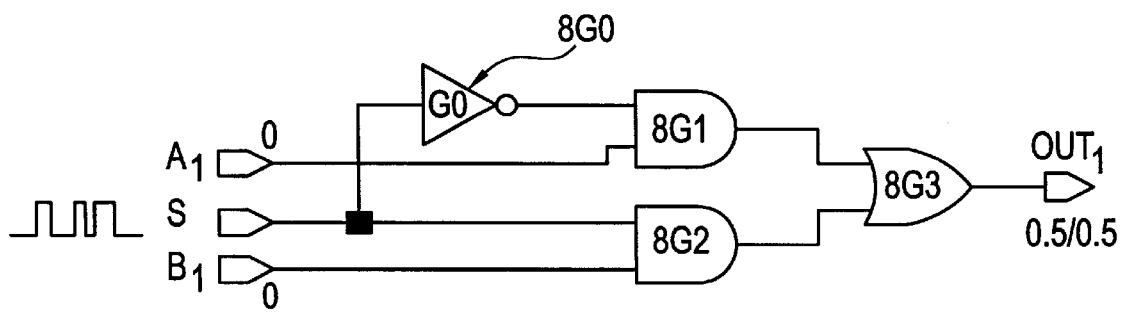
Figure 8B:
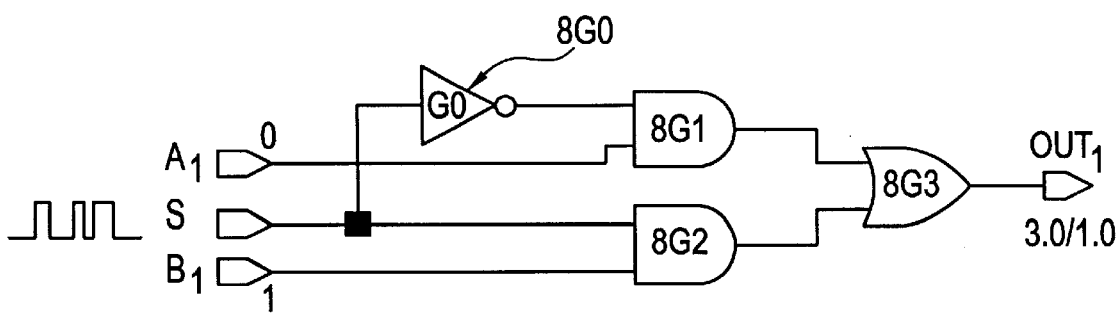
Figure 8C:
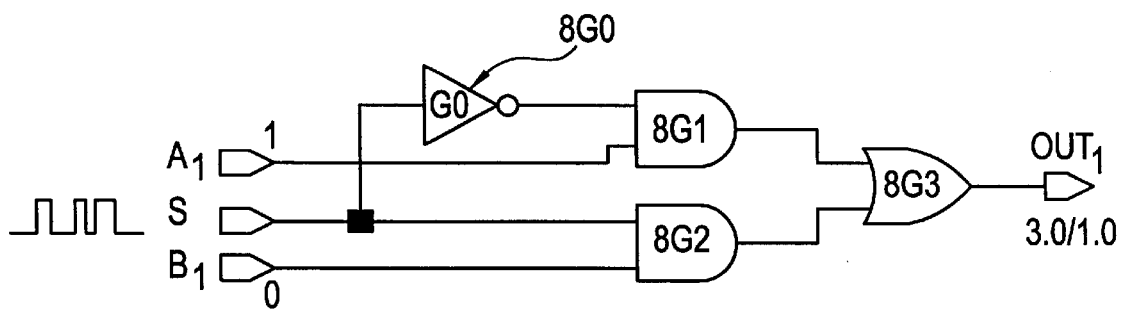
Figure 8D:
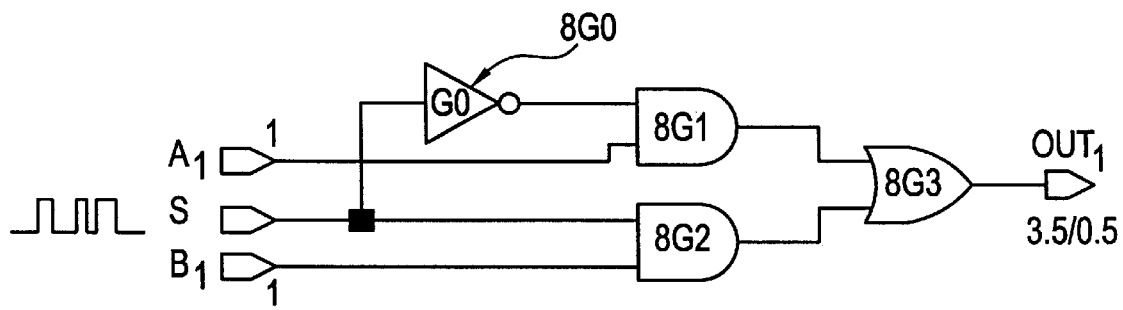

In the circuit shown in FIG. 7 a multiplexer 71 selects between two 8-bit data signals, A and B, depending on whether the expression X<Y evaluates to True or False. The output of the multiplexer is written into a register 72. Since a less-than comparator 73 generates glitches at its output, the select signal of the multiplexer is glitchy. This configuration occurs commonly as part of circuits that implement conditional or control-flow intensive specifications. The data inputs to the multiplexer are not glitchy based on the assumption that A and B are primary inputs or outputs of registers. Moreover, the data inputs to the multiplexer are early arriving, i.e., they settle to their final values much before the select signal settles.

The glitches on the select signal of the multiplexer propagate to its output. The gate-level implementation of a bit-slice of the multiplexer is shown in FIGS. 8(*a*) through 8(*d*). The four figures represent the cases when the relevant bits $A_i$ and $B_i$ assume values of <0,0>, <0,1>, <1,0>, and <1,1>, respectively. In each figure, the first number annotating the multiplexer output represents the number of transitions with glitches, while the second number shows the number of transitions without glitches. In the <0,0> case, glitches on the select signal S are killed at the AND gates 8G1 and 8G2 due to controlling side inputs that arrive early. When the data inputs are <0,1>, glitches on S do not propagate through gate 8G1, but do propagate through gates 8G2 and 8G3. A similar explanation holds when the data inputs are <1,0>. Finally, when the data inputs are <1,1> glitches on S propagate through gates 8G1 and 8G2. The output of the multiplexer is glitchy as a result of the interaction of the glitchy signal waveforms at 8G1 and 8G2. The exact manner in which the waveforms interact depends on the propagation and inertial delays of the various wires and gates in the implementation, which are modeled by the simulator that is used to obtain estimates of switching activity and power consumption.

The propagation of glitches for the <1,1> case can be prevented by inserting a buffer, whose delay is equal to the delay of inverter 8G0, at the fanout branch of S that feeds gate 8G2. Ideally, the insertion of the buffer results in complementary waveforms at the outputs of 8G1 and 8G2 that cancel each other out, i.e., result in a steady 1 at the output of the multiplexer. However, this solution will depend on the exact propagation and inertial delays of the gates and wires in the circuit. Moreover, slight variations in circuit parameters due to process variations can invalidate the effect of path balancing.

IVB.2 Enhancing Data Correlations by Restructuring Multiplexer Networks

An aspect of the present invention is to transform a network corresponding to multiplexers to increase correlations between data inputs. The method of claim 2 of this invention adopts this approach. A system according to claim 13 of this invention uses this approach to design RTL circuits with reduced power consumption.

In the GCD circuit shown in FIG. 1 the 3-to-1 multiplexer network feeds register OUTPUT. The tree of 2-to-1 multiplexers is shown in FIG. 10(*a*). Functionally, the multiplexer tree can be represented by an abstract 3-to-1 multiplexer, as shown in FIG. 10(*b*). The conditions under which OUTPUT, X and ZERO are selected are represented as $C_{OUTPUT}$, $C_X$, and $C_{ZERO}$, respectively. Conditions $C_{OUTPUT}$, $C_X$, and $C_{ZERO}$ must be mutually exclusive. The cumulative switching activities with and without glitches are shown for various signals in the figure.

Given the abstract representation of the 3-to-1 multiplexer network, there are several possible implementations which enhance correlations of the data inputs to the multiplexers in the tree. In the present example, select signal $C_{ZERO}$ is observed to be glitchy, leading to propagation of glitches to the output of the first 2-to-1 multiplexer in FIG. 10(*a*). The data signals OUTPUT and ZERO are highly correlated at the bit level. Hence, in order to minimize the propagation of glitches on $C_{ZERO}$ through the multiplexer tree, the multiplexer tree can be transformed to the implementation shown in FIG. 10(*c*), such that the highly correlated data signals OUTPUT and ZERO become inputs to the first 2-to-1 multiplexer. This significantly lowers the switching activity at the output of the first 2-to-1 multiplexer to 26/20 from 345/20 originally. Multiplexer restructuring also helps to eliminate glitchy select signals as described next.

IVB.3 Restructuring Multiplexer Networks to Eliminate Glitchy Select Signals An aspect of the present invention is to eliminate glitchy control signals to reduce power consumption. The method of claim 3 of this invention adopts this approach. A system according to claim 14 of this invention uses this approach to design RTL circuits with reduced power consumption.

A 3-to-1 multiplexer tree and its representations are shown in FIGS. 10(*a*) and 10(*b*), respectively. The implementation in FIG. 10(*a*) uses only two of the signals from the set $\{C_{OUTPUT}, C_X, C_{ZERO}\}$. In general, in order to implement an abstract n-to-1 multiplexer with n data inputs and n select inputs as a tree of 2-to-1 multiplexers, anywhere between $[\log_2 n]$ and n−1 of the select conditions can be used to generate the expressions for the select signals for the 2-to-1 multiplexers in the implementation, depending on the exact structure of the implementation. It is possible that among the set of select signals to an abstract n-to-1 multiplexer, some carry a lot of glitches in their implementations while others do not. Similarly, as shown in Example 4 above, it is possible that certain expressions involving the select signals of the abstract n-to-1 multiplexer can be glitchy even though the individual signals are not. The multiplexer tree therefore, may be restructured in such a way that as few of the glitchy select inputs to the abstract n-to-1 multiplexer (or combinations of select signals that are glitchy) as possible are used. This concept is illustrated by the next example.

FIG. 11(a) shows a 3-to-1 multiplexer network which is a part of the Barcode reader RTL circuit. As illustrated in Example 4 above, the select signal of the second multiplexer 11a2 in FIG. 11(a) that implements the expression x3+x4 is glitchy. An alternative implementation of the 3-to-1 multiplexer network, that does not require the use of any glitchy select signal expressions, is shown in FIG. 11(c).

IVB.4 Clocking Control Signals to Kill Glitches

When all the above methods for reducing the effect of glitches on control signals do not help, the clock signal is used to kill glitches on control signals that feed either select inputs of multiplexers, or function select inputs of ALUs. It is assumed that the design is implemented using rising-edge-triggered flip-flops and a single phase clock with a duty cycle of 50%. However, disclosed methods can be extended with slight modifications to more complex clocking schemes as well. The method of claim 5 of this invention adopts this approach. A system according to claim 16 of this invention uses this approach to design RTL circuits with reduced power consumption.

Disclosed technique is illustrated in FIGS. 12(a) through 12(c). FIG. 12(a) shows a 2-to-1 multiplexer that is part of the RTL circuit implementing the controller for an Unmanned Auto Vehicle (UAV), see K. Hintz and D. Tabak, Microcontrollers: Architecture, Implementation, and Programming. New York, N.Y. 10020: McGraw-Hill, 1992. The conditions for selecting ZERO and c21 are $C_{ZERO}$=x3. c5 and $C_{c21}$=x3.c5, respectively. In this case, both $C_{ZERO}$ and $C_{c21}$ are glitchy due to the generation of glitches in the less-than comparator that generates signal c5. Thus, multiplexer restructuring transformations that eliminate glitchy control signals cannot be applied here. FIG. 12(b) shows the modified circuit after clocking the select signal to the multiplexer. The original select signal is ANDed with the inverted clock. The output of the AND gate is referred to as the clocked select signal. This ensures that for the first half of the clock period, when the clock is high, the output of the AND gate is forced to 0 in spite of the glitches on its other input. FIG. 12(c) shows example waveforms for the clock, the original select signal and the clocked select signal. The select input to the multiplexer in FIGE. 12(a) and 12(b) is annotated with the activity with and without glitches. The switching activity numbers in the figure show that clocking the control signal significantly reduces its glitching activity.

The technique of clocking control signals needs to be applied judiciously due to the following reasons. By clock ing the control signal, it is prevented from evaluating to its final value until time $$\frac{T}{2},$$

where T is the clock period. In general, this could lead to an increase in the delay of the circuit, if the control signal needs to settle to its final value before $$\frac{T}{2}$$

in order to meet the specified timing constraints at the circuit outputs. It is possible to derive a shifted clock waveform such that the required arrival time of the control signal being clocked is not violated. However, this involves exactly matching the required arrival time at the control signal and the shift imparted to the clock, which is best done after layout, see C. Lemonds and S. S. M. Shetti, "A low power 16 by 16 multiplier using transition reduction circuitry" in Proc. Int. Wkshp. Low Power Design, pp. 139–142 (April 1994). The technique of clocking control signals needs to be applied consecutively, i.e., only when the required arrival time at the control signal is greater than $$\frac{T}{2}$$

by a specified margin of safety. Another problem that can be caused by clocking control signals is that of introducing extra transitions on the control signal under certain conditions. In a situation where the control signal remains at a steady 1 over a pair of clock cycles, forcing the control signal to 0 in the first half of both the clock cycles actually introduces extra transitions on the control signal that can lead to increased power consumption. Thus, the scheme presented in FIG. 12(b) leads to most power savings when the probability of the control signal evaluating to a 1 (signal probability) is low. On the other hand, if the probability of the control signal evaluating to a 1 is very high, an alternate scheme is used to clock the control signal by ORing the original control signal with the clock. This forces the clocked control signal to a 1 in the first half of the clock period, as opposed to 0 in the case of the first scheme, avoiding extra transitions on the clocked control signal when it evaluates to a 1.

IVC. Minimizing Glitch Propagation from Data Signals

The ways in which the propagation of glitches from control signals is reduced to save power were disclosed above. The data signals to a circuit block can also be glitchy, as has been demonstrated earlier. Here, several techniques to restrict propagation of glitches on data signals are disclosed.

An aspect of the present invention is to eliminate glitch propagation to reduce power consumption. The method of claim 3 of this invention adopts this approach. A system according to claim 15 of this invention uses this approach to design RTL circuits with reduced power consumption.

IVC.1 Glitch Reduction Using Selective Rising/falling Delays

In the example circuit shown in FIG. 13(a) a 2-to-1 multiplexer 13a3 selects between the outputs of two adders 13a2 & 13a3, and the multiplexer's output is fed to another adder 13a4. This is a situation that occurs commonly in RTL designs that employ data chaining. As shown above, adders generate glitches even when their inputs are glitch-free. Thus, the data inputs to the multiplexer have glitches, which propagate through the multiplexer and then through the third adder, causing significant power dissipation. To cut down the propagation of glitches through the circuit the invention uses a technique called selective delay insertion which is described below.

The gate-level implementation of a bit-slice of the multiplexer is shown in FIG. 13(b). Both the data inputs to the multiplexer are glitchy. In a pair of consecutive clock cycles $q_1$ and $q_2$ when the select signal to the multiplexer makes a 1→0 (falling) transition from $q_1$ to $q_2$, if the falling transition at S is early arriving, there is an early rising transition at the output of gate 13GO that implements $\dot{S}$. Consequently, the side input of 13G1 becomes non-controlling early, allowing the data input glitches to propagate through 13G1. The invention minimizes this propagation by ensuring that the side input to 13G1 remains controlling as long as possible, which is achieved by delaying the rising transition at the output of 13GO ($\dot{S}$). In other words, a "rising transition delay" is added to the output of 13GO ($\dot{S}$). Similarly, to minimize glitch propagation through gate 13G2 when there is an early rising transition at S, the invention delays the rising transition on the fanout branch of S that feeds AND gate 13G2. Since described technique delays selected (either rising or falling, but not both) transitions at certain signals, it is referred to as selective delay insertion. The selective rising delay blocks are represented by the shaded ellipses shown in FIG. 13(b).

A possible implementation of a rising delay block, that uses one AND gate and a delay element, is shown in FIG. 13(c). The delay element is constructed using either a series of buffers or inverters added to the input. The implementation uses the fact that a falling transition at any one input of an AND gate is sufficient to force the output to 0, while, on the other hand, the latest arriving rising transition among all the inputs will trigger a rising transition at the output. Under a simplified delay model of $d_1$ ns for the delay block and $d_2$ ns for the AND gate, a rising transition at the input is delayed by $(d_1+d_2)$ ns, while a falling transition is delayed by only $d_2$ ns. Since d is typically large compared to $d_2$, the slight increase in propagation of glitches due to the additional delay of $d_2$ ns imparted to the falling transition is far outweighed by the savings obtained for the case of a rising transition. A selective falling delay block is similar to the circuit shown in FIG. 13(c), except that the AND gate is replaced by an OR gate.

Applying the above technique to the example circuit shown in FIG. 13(a) results in a 15.4% decrease in overall power consumption. The following three conditions need to be considered when inserting selective delays. First, a selective delay block comes at a price in terms of the power it consumes. Thus, the expected savings must be large enough to justify this overhead. Secondly, inserting a rising delay block leads to a reduction in the propagation of glitches through a multiplexer only in the clock cycles in which there is a rising transition at the delay block's input. Thus, the probability of a rising transition at the signal where a selective rising delay block is inserted should be high. Thirdly, to ensure that inserting the selective delay block does not increase the delay of the circuit, the delay block is inserted only on select signals that have sufficient slack. For an entire m-bit multiplexer, it suffices to have only one selective rising delay each at the select signal S and its complement $\dot{S}$. To allow this low-cost solution, an m-bit selector is used instead of a multiplexer (a selector implements the function $S_1.A+S_2.B$). The two select signals ($S_1$ and $S_2$) are generated explicitly outside the selector as S and $\dot{S}$.

IVC.2 Effect of Multiplexer Restructuring Transformations on Glitchy Data Signals Multiplexer restructuring transformations can also be used to reduce the propagation of glitches on data signals. This concept is illustrated using a small portion of the GCD RTL circuit, that is shown in FIG. 14(a). The output of the subtractors 14a1 and 14c1 c20, has a lot of glitches which propagate through the multiplexer shown in the figure, and also through the logic that is fed by the multiplexer. It is assumed that signal Y is glitch-free. FIG. 14(b) shows the equivalent abstract 2-to-1 multiplexer. The method utilizes the fact that there might be several instances when the value of the select signal is a don't care, i.e., when $C_{c20}+C_Y$ is not a tautology. In FIG. 14(a), the O-input (i.e., c20) is selected whenever $C_Y$ evaluates to 0. That includes not just the off-set of $C_Y$, but also the set of don't care conditions. In this case, the behavioral synthesis tool specified the select signal to 0 in all the don't care conditions in order to simplify the control logic. The method utilizes the don't care conditions by selecting the less glitchy data input of the multiplexer in the don't care cases. The transformed implementation of the 2-to-1 multiplexer that is shown in FIG. 14(c) illustrates this idea. By having the glitchy data input c20 as the 1 input of the multiplexer 14c2, and thus forcing the select signal to be $C_{c20}$, the method insures that the glitchy data input is selected as infrequently as possible reducing the propagation of glitches to the multiplexer output.

IVC.3 Clocking Control Signals to Kill Data Signal Glitches

When the techniques for handling glitchy data signals presented above are not applicable or not adequate to reduce glitching power consumption, the concept of clocking control signals is utilized to kill data signal glitches. For example, when both the select and data inputs to a multiplexer are glitchy and multiplexer restructuring transformations fail to eliminate the glitchy select signal, the invention uses clocking to solve the problem. As described above, the method forces the control signal to take a particular value for the first half of the clock period. Circuit shown in FIG. 15(a) further illustrates this technique. The output of the subtractor 151 c20, which is glitchy, feeds the data input of a 2-to-1 multiplexer 152. As shown in the figure, this results in significant glitches at the output of the multiplexer. Clocking select signal $C_{c20}$ alleviates the problem as explained next. Since the value on the select signal to the multiplexer is forced to 0 for the first half of the clock period, the multiplexer selects the value of data input Y for this duration. Thus, the glitches on the subtractor's output are killed at the multiplexer for approximately the first half of the clock period. For this example, this leads to a large decrease in the glitching activity at the multiplexer output, as shown in the figure.

Sample waveforms for the clock, original select signal, and the clocked select signal are shown in FIG. 15(b). Again, as mentioned before, it is important to consider the required arrival time at the select signal to the multiplexer and the extra transitions that can be potentially introduced on the clocked select signal before applying this technique.

IVD. An Overall Glitch Reduction Algorithm for RLT Circuits

Previous sections disclosed various techniques according to various aspects of this invention that can be used to minimize the glitching power consumption in RTL circuits, and the conditions under which each technique is applicable. This section discloses the glitch reduction procedure that applies the various glitch reduction techniques to components in the RTL circuit in a suitable order. Claims 8–10 recite this aspect of the invention.

A pseudo-code for a procedure constituting a preferred embodiment of the invention is shown in FIG. 16. The RTL circuit is assumed to consist of an interconnection of RTL blocks or nodes that could represent registers, multiplexers, control nodes, or functional units. Functional units could include arithmetic units such as adders and subtractors, comparators, or vector logic operators.

Procedure $COLLAPSE_{13}$ MUX_NETWORKS traverses the RTL circuit and collapses all multiplexer networks into abstract n-to-1 multiplexers as described earlier. In order to apply the various glitch reduction techniques, one needs information about signal statistics, glitching activity, and delays at various signals in the circuit, including the control signals and the outputs of each RTL unit like functional unit, register, comparator, 2-to-1 multiplexer, etc. First an initial technology mapped gate-level implementation of the RTL circuit is obtained, then a simulator is used to collect the required information about signal statistics and activities. Application of the glitch reduction techniques to a node in the RTL circuit affects signals statistics and glitching activities at all other nodes in its transitive fanout. In order to take the above dependency into account, the RTL circuit is first levelized starting from primary inputs or register outputs to primary outputs or register inputs, then described glitch reduction transformations are applied by visiting nodes in levelized order. Signal statistics, glitching activities, and delays are recomputed by incrementally modifying the technology mapped net list after all nodes at a level have been visited.

Procedure GR_TRANSFORM reduces glitch generation and propagation at a given node in the RTL circuit. If the given node is an n-to-1 MUX node, procedure $CREATE_{13}$ $MINGLITCH_{13}$ MUX_TREE_LEVEL is called to decompose the n-to-1 MUX by extracting a set of 2-to-1 multiplexers that constitute one level of the corresponding multiplexer tree such that glitching activity at the outputs of the created 2-to-1 multiplexers is minimized. If the given node is a CONTROL node that generates one or more control signals, glitch reduction techniques that are aimed at reducing glitching activity at control signals are applied.

Procedure CREATE_MINGLITCH_MUX_TREE_LEVEL decomposes an abstract n-to-1 multiplexer into $$\left\lfloor \frac{n}{2} \right\rfloor$$

2-to-1 multiplexers feeding a $$\left\lceil \frac{n}{2} \right\rceil$$

-to-1 abstract multiplexer. The glitching activity at the output of the various created 2-to-1 multiplexers is minimized by grouping data inputs so as to eliminate glitchy control signals, maximize data input correlations, and select glitchy data inputs as infrequently as possible. The procedure also determines which bit-slices, if any, of each created 2-to-1 multiplexer to add the consensus term to, which bit-slices to add selective delays to, and whether to clock the control signals that feed the select inputs of the created 2-to-1 multiplexers.

IVE. Techniques for Reducing Register Power Consumption by Gating Clock Inputs to Registers Another aspect of this invention is a method for reducing power consumption by inserting clocking gates at control signals. The method recited in claim 11 uses such an approach. The system recited in claim 19 uses this approach to design RTL circuits with reduced power consumption.

It has been shown earlier that registers are responsible for a significant fraction of the total power consumption. A large part of the register power consumption, in turn, is due to the transitions on the clock inputs to registers. The technique of gating the clock inputs to registers is applied in order to reduce power consumption in registers. It is important to ensure that there are no glitches on the gated clock signal and that the required timing constraints for the clocking scheme are satisfied. Procedures that are used to derive gating constraints for clock inputs to registers ensure that such constraints are met.

Methods to automatically detect conditions under which the clocks can be shut off based on identifying self-loops and unreachable states in the state transition graph were described in L. Benini, P. Siegel, and G. DeMicheli, "Saving power by synthesizing gated clocks for sequential circuits," *IEEE Design & Test of Computers*, pp. 32–41, Winter 1994. The distinguishing features of present invention with respect to the previous technique of gating clocks are as follows: (i) the present method identifies separate gating conditions for each register in the circuit, which can lead to greater opportunities for gating clocks, (ii) a scheme has been developed for applying the technique of gating clocks to designs with edge-triggered flip-flops, and (iii) disclosed procedures, which are based on a structural analysis of the given RTL circuit, are applicable to all the registers of a design, including the data path registers. The techniques presented in L. Benini et al. mentioned above require the STG of the circuit and hence can be applied only to the control logic and random logic parts of a design.

An example of the application of the basic technique of gating clocks to registers is illustrated in FIG. 17. In the circuit in FIG. 17(*a*) the register 17*a*1 re-loads its previous value when the less-than comparator's output is 0. Hence, whenever the comparator output evaluates to 0, the clock input to the register can be suppressed from making a transition. For this example, it is assumed that the design is based on single phase rising-edge-triggered flip-flops. FIG. 17(*b*) shows two candidate schemes to gate the clock input to the register. These schemes are referred to as Scheme 1 and Scheme 2, respectively. The rationale behind Scheme 1 is that the register clock input would be forced to a 0 whenever the output of the comparator evaluates to a 0, thus suppressing the unnecessary transitions on the clock. The reasoning for Scheme 2 is the same as for Scheme 1, except that the register clock input is forced to a 1 whenever the comparator's output evaluates to 0. Thus, an initial analysis suggests that both the schemes are equivalent. However, when timing constraints are taken into account, the schemes are far from equivalent. Sample waveforms shown in FIG. 17(*c*) for both the schemes illustrate why it is the case. For Scheme 1 to work, it is required that the comparator's output evaluate to 0 before the clock edge rises, i.e., at t=0. This is not possible since the new inputs to the comparator are applied only at t=0, and the comparator obviously requires a finite non-zero delay before its output is stable. Hence, Scheme 1 does not work when timing considerations are taken into account. On the other hand, Scheme 2 will work as long as the gating condition stabilizes before half the clock period.

In order to gate the clock input to a register, the set of conditions under which the register does not need to load a new value needs to be computed. These gating conditions are obtained during behavioral synthesis if the design is synthesized from a behavioral description. Lifetime analysis, that is used during behavioral synthesis for resource sharing, reveals the exact set of conditions under which each register needs to load a new value. In general, the gating conditions thus obtained are in the form of expressions involving the present state of the controller and also the outputs of comparators that evaluate the various conditions in the behavioral description.

Alternatively, if only the RTL description of the design is given, the following procedure is used to derive the gating conditions. For each register, the multiplexer network that feeds it is analyzed to determine whether the register's output is fed back as one of the data inputs to the multiplexer network. The presence of such a self-loop from a register's output back to its data input is typical in manually designed RTL circuits as well as RTL circuits produced by high-level synthesis tools. The conditions under which this self-loop is logically activated represent the conditions under which the register retains its previous data value. The path through the multiplexer network is traversed starting at the identified data input to the multiplexer network and ending at the output of the multiplexer network that is connected to the input of the register. Then the condition for this path to be activated is computed in terms of the select signals connected to the individual multiplexers along the path. The condition that the path is activated is written as the conjunction of the conditions that each multiplexer along the path selects the on-path input.

In the general case, a register in an RTL circuit has a self-loop passing through n 2-to-1 multiplexers in a multiplexer network. Conditions $Sel_1, Sel_2, \ldots, Sel_n$ represent the conditions under which the multiplexers in the path that forms the self-loop select the on-path inputs. $Sel_i$ is either equal to the control signal that feeds the select input of the corresponding multiplexer, or its complement, depending on whether the on-path input is the 1-input or 0-input to the multiplexer. The gating condition for the register clock are then written as $Sel_1.Sel_2 \ldots Sel_n$.

Since the logic to compute the select signals to the various multiplexers in the multiplexer network is already implemented, one only needs to add the logic required to invert the control signals where necessary, and compute the conjunction of the individual conditions for each multiplexer in the path. The above procedure to derive gating conditions does not guarantee that the required timing constraint (the gating condition should stabilize within the first half of the clock period) is met. Failure to meet the required timing constraints can lead to the generation of spurious transitions on the clock inputs to registers. This not only causes additional power consumption, but can also cause the registers to load incorrect values. One possible solution to get around this problem is to clock the design slower. Alternatively, it is possible to explore the possibility of changing the duty cycle of the clock while maintaining the same clock period. However, these schemes involve either a performance penalty or a change in the initial clocking scheme, both of which may often be undesirable. In order to ensure that the required timing constraints are met, the above procedure is augmented as follows. After the expression for the gating condition is computed as specified in the previous paragraph, it is checked using an initial implementation whether the arrival time at the gating condition is less than half the clock period. If this condition is not met, a reduced gating condition which is guaranteed to satisfy the timing constraint is derived using a subset of the terms used in the original gating condition. The expression for the gating condition is first converted to a sum-of-products form, and the high-level delay estimator, FEST, is used to determine the arrival times at the signals representing each product term. See S. Bhattacharya, S. Dey, and F. Brglez, "Provably correct high-level timing analysis without path sensitization," in *Proc. Int. Conf. Computer-Aided Design*, pp. 736–742 (November 1994). A subset of the product term is identified such that the largest arrival time among the product terms plus the delay of the logic required to compute the OR of the selected terms is less than half the clock period. Heuristic methods to obtain a reduced cover for the gating condition were presented in L. Benini, P. Siegel, and G. DeMicheli, "Saving power by synthesizing gated clocks for sequential circuits," *IEEE Design & Test of Computers*, pp. 32–41, Winter 1994. However, the aim there was to minimize the overhead required to synthesize the logic implementing the gating condition, while primary goal of the present method is to eliminate terms that cause the initial expression to violate the timing constraint.

While described procedures derive a separate gating condition for each data path register, the gating conditions for a group of registers can be combined into a single gating condition that can be used to gate the clock input to all the registers in the group. The benefit of such merging is that it is possible to suppress unnecessary transitions in parts of the clock distribution network as well. However, the clock transition to multiple registers can be suppressed only if all of the individual gating conditions are satisfied. Hence, the number of transitions suppressed at the clock inputs to some of the registers, when a merged gating condition is used, may be less than the number of transitions that could have been suppressed by using individual gating conditions.

IVF. Experimental Results

Described power reduction techniques were applied to six RTL circuits implementing: GCD, a Barcode reader preprocessor (Barcode), the controller for an Unmanned Auto Vehicle (UAV), a vending machine controller (Vendor), a line-drawing process that is part of a graphics controller chip, and a transmitter process that implements part of the X.25 communications protocol (X.25). See High-level synthesis benchmarks, CAD Benchmarking Laboratory, Research Triangle Park, N.C., benchmarks can be downloaded from http://www.cbl.ncsu.edu, K. Hintz and D. Tabak, Microcontrollers: Architecture, Implementation, and Programming. New York, N.Y. 10020: McGraw-Hill, 1992; D. L. Perry, VHDL. New York, N.Y. 10020: McGraw-Hill, 1991; S. Dey, A. Raghunathan, N. K. Jha, and K. Wakabayashi, "Controller re-specification to minimize switching activity in controller/data path circuits," Tech. Rep.96-C007-5016-1, NEC C&LC Research Labs, Princeton, N.J., (March 1996) (Graphics), and S. Bhattacharya, S. Dey, and F. Brglez, "Performance analysis and optimization of schedules for conditional and loop-intensive specifications," in *Proc. Design Automation Conf.*, pp. 491–496 (June 1994).

The design flow used in experiments is shown in FIG. 19. This design flow is self-explanatory. The initial RTL circuits were obtained by synthesizing VHDL behavioral descriptions in 191 using the SECONDS high-level synthesis system in 192 described in S. Bhattacharya, S. Dey, and F. Brglez, "Performance analysis and optimization of schedules for conditional and loop-intensive specifications," in *Proc. Design Automation Conf.*, pp. 491–496 (June 1994); S. Bhattacharya, S. Dey, and F. Brglez, "Clock period optimization during resource sharing and assignment," in *Proc. Design Automation Conf.*, pp. 195–200 (June 1994); and S. Bhattacharya, S. Dey, and F. Brglez, "Provably correct high-level timing analysis without path sensitization," in *Proc. Int. Conf. Computer-Aided Design*, pp. 736–742 (November 1994). The circuits were mapped to the NEC CMOS6 library and the mapped gate-level net lists in 198 were simulated in 197 using CSIM to determine glitching activity and signal statistics of various signals in the circuit. See CMOS6 Library Manual, NEC Electronics, Inc. (December 1992) and CSIM Version 5 Users Manual, Systems LSI Division, NEC Corp. (1993). The simulation results are passed back to the described RTL power optimization techniques in 1910 that transform the initial RTL design to reduce the generation and propagation of glitches. As mentioned above, the application of glitch-reducing transformations can impact glitching activities and signal statistics in a global manner. Therefore the procedure incrementally re-computes the information used to drive the transformations in order to ensure maximal power savings. Described glitch reduction transformations are applied to all RTL nodes at one level in the RTL circuit, the technology-mapped netlist are incrementally modified to reflect the transformations, and glitching activities and signal statistics are being re-computed for guiding the application of glitch-reduction transformations to RTL nodes at other levels. Both the original and the optimized RTL circuits are evaluated for area and delay using NEC's VARCHSYN synthesis system, and for power consumption using CSIM. See VARCHSYN Version 2.0 Users Manual, Advanced CAD Development Laboratory, NEC Corporation (November 1993).

The vectors used for simulation are obtained as follows. For each design, the behavioral test bench for the design was utilized to simulate the scheduled behavioral description using the VHDL simulator, VSIM, and obtain a cycle-by-cycle input vector trace. See Model Technology, Inc., VSYSTEM users manual. The above step is especially important for control-flow intensive designs where, unlike data-flow intensive specifications, the number of clock cycles required to perform the computation varies depending on the input values. The cycle-by-cycle input vector trace was used both for collecting information about glitching activity and signal statistics and for evaluating the initial and optimized designs for power consumption.

Table 3 shown in FIG. 22 reports the results of the experiments. The power, area (# of transistor pairs), and delay numbers are obtained after mapping to the technology library used. The results show that described techniques can significantly reduce power consumption of RTL designs. Note that described glitch reduction techniques target power reduction solely by reducing the propagation of glitches between various blocks in the RTL circuit. Thus, these techniques can be combined with other power reduction techniques that attempt to suppress transitions that do not correspond to glitches. The area and delay overheads incurred by described power reduction techniques can be seen to be nominal. In some cases, the area and delay of the circuit after applying disclosed techniques is even slightly lower than the original circuit. This can be attributed to the fact that multiplexer restructuring transformations can lead to a simplification in control logic, which can result in area and delay reductions.

IVG. CONCLUSION

Several techniques are disclosed that reduce power consumption in RTL designs. The key features of disclosed techniques are that: (i) they focus on power consumption due to the propagation of glitches across the various blocks in the circuit, and (ii) they target power consumed by not just functional units, but also multiplexers and registers in the design, which may consume a major part of the total power for control-flow intensive designs. Disclosed glitch reduction techniques are based on an analysis of generation and propagation of glitches in RTL circuits. Because registers can consume a significant part of the total power and most of the register power is in turn caused by transitions on the clock input, clock inputs to registers are gated with conditions derived by an analysis of the RTL circuit, ensuring that glitches are not introduced on the clock signals. Experimental results demonstrate the efficacy of the disclosed techniques in providing significant power reductions with nominal area and delay overheads.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method of reducing power consumption in register-transfer level (RTL) VLSI circuits comprising one of random and control logic, at least one functional unit, at least one register, and at least one multiplexer, wherein said method comprises:
   identifying glitches in the circuit; and
   minimizing power consumption by transforming the RTL VLSI circuit to reduce glitches.

2. The method of claim 1, wherein said method comprises transforming a network corresponding to said at least one multiplexer to increase correlations between data inputs.

3. The method of claim 1, wherein said method comprises transforming a network corresponding to said at least one multiplexer to eliminate glitchy control signals.

4. The method of claim 1, wherein said method comprises transforming a network corresponding to said at least one multiplexer to minimize glitch propagation from data inputs of the network.

5. The method of claim 1, wherein said method is performed by identifying control signals in the circuit and inserting clocking gates at the control signals.

6. The method of claim 1, wherein said method is performed by identifying rising delay gates in the circuit and selecting rising delay gates to minimize glitch propagation.

7. The method of claim 1, wherein said method is performed by identifying control signals in the circuit and selecting falling delay gates to minimize glitch propagation.

8. The method of claim 1, wherein said method further comprises:
   (a) pre-processing the RTL VLSI circuit to collapse all networks of multiplexer components into single multiplexers with arbitrary numbers of data inputs;
   (b) collecting activity statistics for at least one signal in the RTL VLSI circuit;

(c) collecting delay statistics for said at least one signal in the VLSI RTL circuit;

(d) selecting a component in the VLSI RTL circuit and applying at least one transformation to reduce glitching power consumption; and (f) repeating step (d) for all components in the RTL VLSI circuit.

9. A method according to claim 8, wherein step (d) comprises:

(d) (1) replacing the component with 2-to-1 multiplexers and feeding the multiplexers with a reduced number of inputs if an component is a multiplexer with greater than two inputs; and (d) (2) clocking the output signal by inserting one of an AND and OR gate with its side input fed by one of the clock signal and the complement of said clock signal if the component is a control logic node.

10. A method according to claim 9, wherein step (d) (1) comprises:

(d) (1) (i) creating a list containing all the component's data inputs;

(d) (1) (ii) choosing and deleting two inputs from the list such that the estimated glitching activity of a 2-to -1 multiplexer fed by the two inputs is minimum;

(d) (1) (iii) disconnecting the two inputs from the component;

(d) (1) (iv) creating a new 2-to-1 multiplexer fed by the two inputs;

(d) (i) (v) connecting an output of the new 2-to-1 multiplexer as an input of the component;

(d) (1) (vi) inserting selective delays based on delay and activity information into the new 2-to-1 multiplexer created in (d) (1) (iv);

(d) (1) (vii) inserting a clocking gate at the select input of a new 2-to-1 multiplexer created in (d) (1) (iv); and (d) (1) (viii) repeating steps (d) (1) (ii)–(d) (1) (vii) for all elements of the list created in (d) (1) (i).

11. The method of claim 1, wherein further power reduction is obtained by gating clock inputs to said at least one register, said method further comprising:

(a) identifying a self-loop from output of said at least one register to an input of said at least one register that passes through said at least one multiplexer;

(b) identifying select signal conditions under which said at least one multiplexer selects an on-path input;

(c) deriving clock gating condition for said at least one register as a conjunction of the select signal conditions;

(d) using the clock gating condition derived in step (c), if an estimated arrival time at gating signal satisfies required timing constraints, wherein the gating signal implements the clock gating condition; and (e) deriving a reduced gating condition if the gating signal in step (d) does not satisfy the required timing constraints thereof.

12. A system for reducing power consumption in register-transfer level (RTL) VLSI circuits comprising one of random and control logic, at least one functional unit, at least one register, and at least one multiplexer, wherein said system minimizes power consumption due to glitching by transforming the RTL VLSI circuit.

13. The system of claim 12, wherein said system transforms a network corresponding to said at least one multiplexer to increase correlations between data inputs.

14. The system of claim 12, wherein said system transforms a network corresponding to said at least one multiplexer to eliminate glitchy control signals.

15. The system of claim 12, wherein said system transforms a network corresponding to said at least one multiplexer to minimize glitch propagation from its data inputs.

16. The system of claim 12, wherein said system identifies control signals in the circuit and inserts clocking gates at the control signals.

17. The system of claim 12, wherein said system identifies rising delay gates in the circuit and selects rising delay gates to minimize glitch propagation.

18. The system of claim 12, wherein said system identifies falling delay gates in the circuit and selects falling delay gates to minimize glitch propagation.

19. The system of claim 12 wherein the system further reduces power consumption by gating clock signals to registers for which a self-loop exists from the register output to its input that passes through at least one multiplexer.

* * * * *

UNITED STATES PATENT AND TRADEMARK OFFICE
CERTIFICATE OF CORRECTION

PATENT NO.   : 6,324,679 B1
DATED        : November 27, 2001
INVENTOR(S)  : Raghunathan, Anand, Jha, Niraj, Dey and Sujit It is certified that error appears in the above-identified patent and that said Letters Patent is hereby corrected as shown below:

Column 13,
Line 61, delete "FIGE" insert -- FIG.s --

Column 17,
Line 44, delete "CREATE$_{13}$" insert -- CREATE --;
Line 45, delete Minglitch" insert -- MINGLITCH --

Column 23,
Line 15, delete "the output" insert -- an output --

Signed and Sealed this

Thirteenth Day of August, 2002

Attest:

JAMES E. ROGAN
Attesting Officer          Director of the United States Patent and Trademark Office

UNITED STATES PATENT AND TRADEMARK OFFICE
CERTIFICATE OF CORRECTION

PATENT NO. : 6,324,679 B1
DATED : November 27, 2001
INVENTOR(S) : Anand Raghunathan and Sujit Dey It is certified that error appears in the above-identified patent and that said Letters Patent is hereby corrected as shown below:

<u>Title page,</u>
Change the indication of the assignee to read as follows:

-- [73] Assignee: NEC USA, Inc., Princeton, NJ --

Signed and Sealed this

Twenty-first Day of January, 2003

JAMES E. ROGAN
*Director of the United States Patent and Trademark Office*